(12) United States Patent
Brandon, II

(10) Patent No.: US 8,652,665 B2
(45) Date of Patent: Feb. 18, 2014

(54) SYSTEM AND METHOD OF CONTROLLING FLUID TO A FLUID CONSUMING BATTERY

(75) Inventor: Michael J. Brandon, II, North Ridge, OH (US)

(73) Assignee: Eveready Battery Co. Inc., St. Louis, MI (US)

(*) Notice: Subject to any disclaimer, the term of this patent is extended or adjusted under 35 U.S.C. 154(b) by 713 days.

(21) Appl. No.: 12/123,513

(22) Filed: May 20, 2008

(65) Prior Publication Data

US 2009/0291332 A1  Nov. 26, 2009

(51) Int. Cl.
*H01M 2/36* (2006.01)
*H01M 4/36* (2006.01)
*H01M 8/04* (2006.01)

(52) U.S. Cl.
USPC ............... 429/50; 429/72; 429/101; 429/430

(58) Field of Classification Search
USPC ............ 429/13, 22, 23, 27, 122, 50, 72, 101, 429/430
See application file for complete search history.

(56) References Cited

U.S. PATENT DOCUMENTS

| | | | |
|---|---|---|---|
| 3,711,333 A * | 1/1973 | Kohlmuller | 429/432 |
| 4,794,309 A | 12/1988 | Saito | |
| 5,079,106 A | 1/1992 | Urry | |
| 5,356,729 A | 10/1994 | Pedicini | |
| 5,387,477 A | 2/1995 | Cheiky | |
| 5,560,999 A | 10/1996 | Pedicini et al. | |
| 5,571,630 A | 11/1996 | Cheiky | |
| 5,691,074 A | 11/1997 | Pedicini | |
| 5,733,676 A | 3/1998 | Dopp et al. | |
| 5,795,667 A | 8/1998 | McKenzie et al. | |
| 6,106,962 A | 8/2000 | Pedicini | |
| 6,322,913 B2 | 11/2001 | Pedicini et al. | |
| 6,365,296 B1 | 4/2002 | Young | |
| 6,383,674 B1 | 5/2002 | Urry | |
| 6,475,658 B1 | 11/2002 | Pedicini et al. | |
| 6,492,046 B1 | 12/2002 | Payne et al. | |
| 6,500,575 B1 | 12/2002 | Shiue et al. | |
| 6,558,828 B1 | 5/2003 | Guo | |
| 6,641,947 B1 | 11/2003 | Molloy et al. | |

(Continued)

FOREIGN PATENT DOCUMENTS

| | | |
|---|---|---|
| EP | 01215743 A1 | 6/2002 |
| EP | 01217677 A1 | 6/2002 |

(Continued)

OTHER PUBLICATIONS

Abstract of JP 2006252928 A, Akita, Masahiro, Sep. 2006.*

(Continued)

*Primary Examiner* — Kenneth Douyette
(74) *Attorney, Agent, or Firm* — Russell H. Toye, Jr.

(57) ABSTRACT

A fluid regulating system is provided for controlling fluid to a fluid consuming battery having a fluid consuming cell. The fluid regulating system includes a valve and an actuator for opening and closing the valve. The actuator is controlled to open the valve when greater battery electrical output is required and to close the valve when lesser battery electrical output is required to operate a device. A controller controls operation of the actuator to open and close the valve based on a monitored rate of change in electrical output, such as voltage, compared to a rate of change threshold, wherein the valve is opened when the monitored rate of change exceeds the threshold.

10 Claims, 24 Drawing Sheets

(56) References Cited

U.S. PATENT DOCUMENTS

| | | |
|---|---|---|
| 6,794,074 B2 | 9/2004 | Vu et al. |
| 6,981,520 B2 | 1/2006 | Sherman et al. |
| 7,332,238 B2 | 2/2008 | Motupally et al. |
| 2002/0150814 A1 | 10/2002 | Causton et al. |
| 2003/0049508 A1 | 3/2003 | Iarochenko et al. |
| 2003/0186099 A1 | 10/2003 | Liu et al. |
| 2004/0121204 A1* | 6/2004 | Adelman et al. ............. 429/22 |
| 2005/0112427 A1* | 5/2005 | Bailey et al. ................ 429/22 |
| 2005/0136321 A1 | 6/2005 | Bailey |
| 2006/0134510 A1 | 6/2006 | Cabuz |
| 2007/0031714 A1 | 2/2007 | Huang |
| 2008/0085436 A1 | 4/2008 | Langan et al. |
| 2008/0085443 A1 | 4/2008 | Somerville et al. |
| 2008/0085444 A1 | 4/2008 | Langan et al. |
| 2008/0090135 A1 | 4/2008 | Wu et al. |
| 2008/0096067 A1 | 4/2008 | Langan et al. |
| 2008/0096069 A1 | 4/2008 | Bailey et al. |
| 2008/0096082 A1 | 4/2008 | Langan et al. |
| 2008/0254330 A1 | 10/2008 | Jones et al. |
| 2008/0254340 A1 | 10/2008 | Blakey et al. |
| 2008/0254341 A1 | 10/2008 | Bailey et al. |
| 2008/0254345 A1 | 10/2008 | Broburg et al. |
| 2008/0254346 A1 | 10/2008 | Burstall et al. |
| 2009/0081519 A1 | 3/2009 | Bailey |

FOREIGN PATENT DOCUMENTS

| | | | |
|---|---|---|---|
| EP | 01860719 A1 | | 11/2007 |
| JP | 2006252928 A | * | 9/2006 |
| WO | 9425991 A2 | | 11/1994 |
| WO | 0109519 A1 | | 2/2001 |
| WO | 0235641 A1 | | 5/2002 |
| WO | 2005004273 A2 | | 1/2005 |

OTHER PUBLICATIONS

Patent Cooperation Treaty (PCT), International Search Report and Written Opinion for Application No. PCT/US2009/003011, filed May 14, 2009, mailed Dec. 24, 2009, Korean Intellectual Property Office, Korea.

Patent Cooperation Treaty (PCT), International Search Report and Written Opinion for Application No. PCT/US2009/003013, filed May 14, 2009, mailed Jan. 14, 2010, Korean Intellectual Property Office, Korea.

US Application of Michael J. Brandon, II, entitled System and Method of Controlling Fluid to a Fluid Consuming Battery, submitted to the US Patent Office on May 20, 2008, U.S. Appl. No. 12/123,490.

* cited by examiner

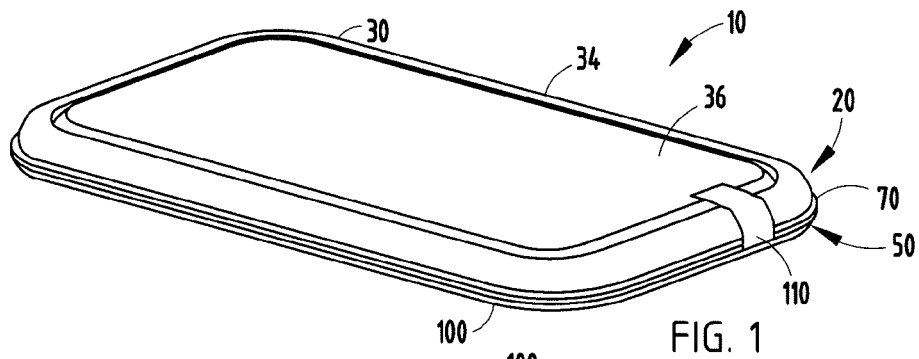
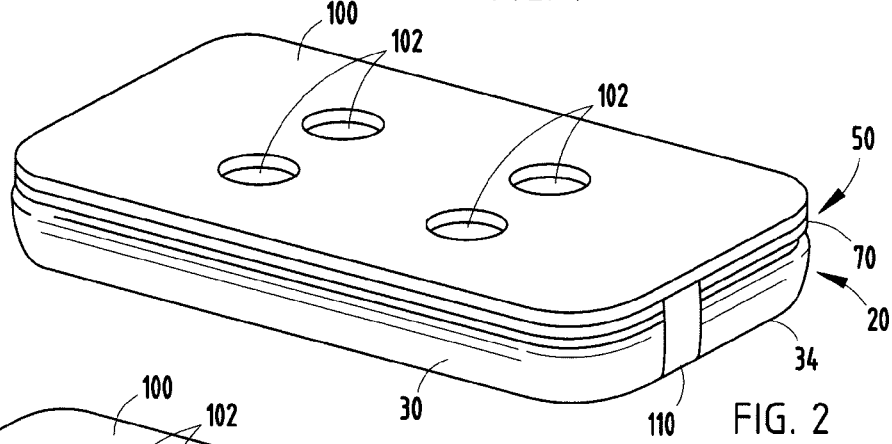
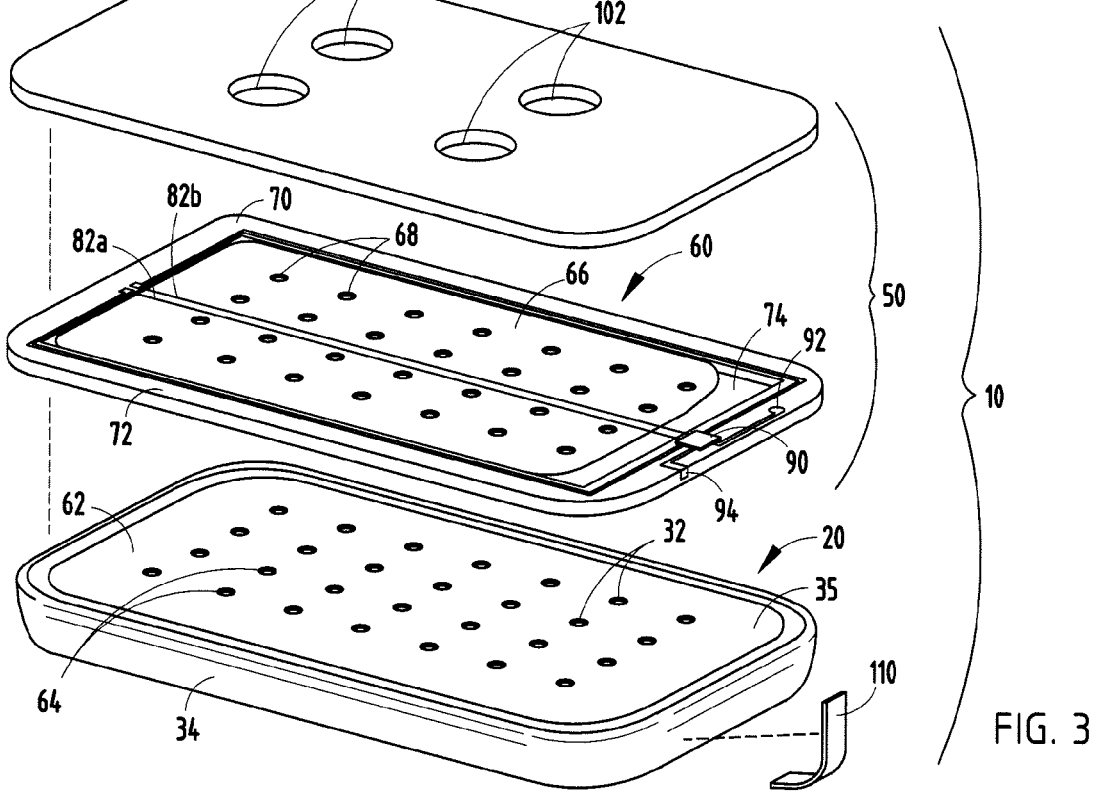

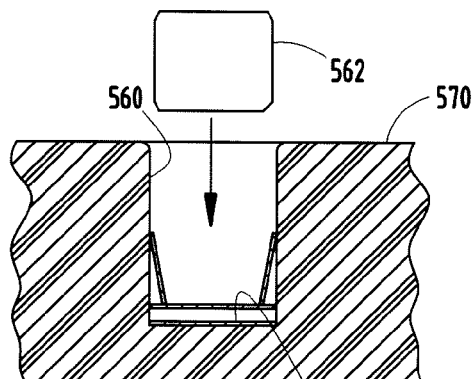
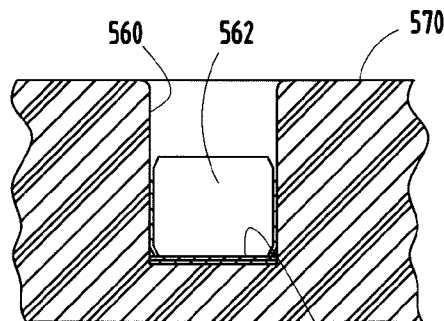
FIG. 45   FIG. 46
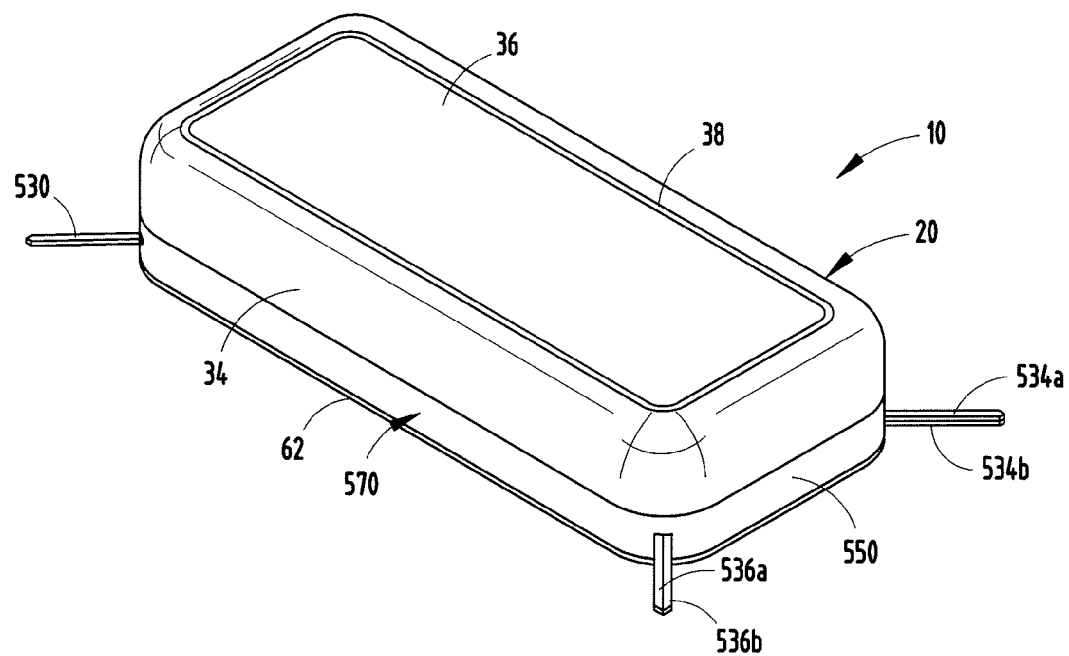
FIG. 47

| TEMPERATURE IN °C | MINIMUM DRIVER ON-TIME IN MILLISECONDS |
|---|---|
| 0 | 500 |
| 10 | 445 |
| 20 | 390 |
| 30 | 335 |
| 40 | 280 |
| 50 | 225 |
| 60 | 170 |
| 70 | 115 |

FIG. 53

SYSTEM AND METHOD OF CONTROLLING FLUID TO A FLUID CONSUMING BATTERY

BACKGROUND OF THE INVENTION

This invention generally relates to fluid regulating systems for controlling the rate of entry of fluids, such as gases, into and out of electrochemical batteries and cells with fluid consuming electrodes, and to the batteries and cells in which such fluid regulating systems are used, particularly air-depolarized, air-assisted and fuel cells and batteries.

Electrochemical battery cells that use a fluid, such as oxygen and other gases, from outside the cell as an active material to produce electrical energy, such as air-depolarized, air-assisted and fuel cell battery cells, can be used to power a variety of portable electronic devices. For example, air enters into an air-depolarized or air-assisted cell, where it can be used as, or can recharge, the positive electrode active material. The oxygen reduction electrode promotes the reaction of the oxygen with the cell electrolyte and, ultimately, the oxidation of the negative electrode active material with the oxygen. The material in the oxygen reduction electrode that promotes the reaction of oxygen with the electrolyte is often referred to as a catalyst. However, some materials used in oxygen reduction electrodes are not true catalysts because they can be at least partially reduced, particularly during periods of relatively high rate of discharge.

One type of air-depolarized cell is a zinc/air cell. This type of cell uses zinc as the negative electrode active material and has an aqueous alkaline (e.g., KOH) electrolyte. Manganese oxides that can be used in zinc/air cell air electrodes are capable of electrochemical reduction in concert with oxidation of the negative electrode active material, particularly when the rate of diffusion of oxygen into the air electrode is insufficient. These manganese oxides can then be reoxidized by the oxygen during periods of lower rate discharge or rest.

Air-assisted cells are hybrid cells that contain consumable positive and negative electrode active materials as well as an oxygen reduction electrode. The positive electrode can sustain a high discharge rate for a significant period of time, but through the oxygen reduction electrode, oxygen can partially recharge the positive electrode during periods of lower or no discharge, so oxygen can be used for a substantial portion of the total cell discharge capacity. This means the amount of positive electrode active material put into the cell can be reduced and the amount of negative electrode active material can be increased to increase the total cell capacity. Examples of air-assisted cells are disclosed in commonly assigned U.S. Pat. Nos. 6,383,674 and 5,079,106.

An advantage of air-depolarized, air-assisted, and fuel cells is their high energy density, since at least a portion of the active material of at least one of the electrodes comes from or is regenerated by a fluid (e.g., a gas) from outside the cell.

A disadvantage of these cells is that the maximum discharge rates they are capable of can be limited by the rate at which oxygen can enter the oxygen reduction electrode. In the past, efforts have been made to increase the rate of oxygen entry into the oxygen reduction electrode and/or control the rate of entry of undesirable gases, such as carbon dioxide, that can cause wasteful reactions, as well as the rate of water entry or loss (depending on the relative water vapor partial pressures outside and inside the cell) that can fill void space in the cell intended to accommodate the increased volume of discharge reaction products or dry the cell out, respectively. Examples of these approaches can be found in U.S. Pat. Nos. 6,558,828; 6,492,046; 5,795,667; 5,733,676; U.S. Patent Publication No. 2002/0150814; and International Patent Publication No. WO02/35641. However, changing the diffusion rate of one of these gases generally affects the others as well. Even when efforts have been made to balance the need for a high rate of oxygen diffusion and low rates of $CO_2$ and water diffusion, there has been only limited success.

At higher discharge rates, it is more important to get sufficient oxygen into the oxygen reduction electrode, but during periods of lower discharge rates and periods of time when the cell is not in use, the importance of minimizing $CO_2$ and water diffusion increases. To provide an increase in air flow into the cell only during periods of high rate discharge, fans have been used to force air into cells (e.g., U.S. Pat. No. 6,500,575), but fans and controls for them can add cost and complexity to manufacturing, and fans, even micro fans, can take up valuable volume within individual cells, multiple cell battery packs and devices.

Another approach that has been proposed is to use valves to control the amount of air entering the cells (e.g., U.S. Pat. No. 6,641,947 and U.S. Patent Publication No. 2003/0186099), but external means, such as fans and/or relatively complicated electronics, can be required to operate the valves.

Yet another approach has been to use a water impermeable membrane between an oxygen reduction electrode and the outside environment having flaps that can open and close as a result of a differential in air pressure, e.g., resulting from a consumption of oxygen when the battery is discharging (e.g., U.S. Patent Publication No. 2003/0049508). However, the pressure differential may be small and can be affected by the atmospheric conditions outside the battery.

Commonly assigned U.S. Patent Publication No. 2005/0136321 discloses a valve that is operated by an actuator that responds to changes in a potential applied across the actuator to open and close the valve.

SUMMARY OF THE INVENTION

According to one aspect of the present invention, a method of controlling fluid supplied to a fluid consuming battery is provided. The method includes the step of providing a fluid regulating system that includes a valve for adjusting rate of passage of fluid into a fluid consuming electrode of a battery and an actuator for operating the valve. The method also includes the step of monitoring a rate of change in battery electrical output with respect to time. The method further includes the steps of comparing the monitored rate of change in battery electrical output to a rate of change threshold, and opening the valve when the monitored rate of change in battery electrical output exceeds the rate of change threshold.

According to yet another aspect of the present invention, a fluid regulating system for regulating fluid to a fluid consuming battery is provided. The system includes a valve for adjusting rate of passage of fluid into a fluid consuming electrode of a battery, and an actuator for operating the valve between at least an open position and a closed position. The system also includes a controller for controlling operation of the actuator to open and close the valve. The controller monitors a rate of change in battery electrical output with respect to time, compares the monitored rate of change in battery electrical output to a rate of change threshold, and opens the valve if the monitored rate of change in battery electrical output exceeds the rate of change threshold.

These and other features, advantages, and objects of the present invention will be further understood and appreciated by those skilled in the art by reference to the following specification, claims, and appended drawings.

BRIEF DESCRIPTION OF THE DRAWINGS

In the drawings:

FIG. 1 is a perspective view of a battery constructed in accordance with a first embodiment of the present invention showing the top of the battery;

FIG. 2 is a perspective view of the battery shown in FIG. 1 showing the bottom of the battery;

FIG. 3 is an exploded perspective view showing the bottom of the battery along with the components forming a fluid regulating system used with the battery;

FIG. 45 is a cross-sectional view of a crimp connection prior to assembly according to a further embodiment;

FIG. 46 is a cross-sectional view of the assembled crimp connection shown in FIG. 45;

FIG. 47 is a perspective view of the battery following assembly of the fluid consuming cell to the chassis;

FIG. 53 is a lookup table illustrating minimum required times for maintaining the valve in the open position based on a sensed temperature, according to one embodiment.

DETAILED DESCRIPTION OF THE PREFERRED EMBODIMENTS

Embodiments of this invention include a fluid regulating system for a battery that includes an electrochemical cell that utilizes a fluid (such as oxygen or another gas) from outside the cell as an active material for one of the electrodes. The cell has a fluid consuming electrode, such as an oxygen reduction electrode. The cell can be an air-depolarized cell, an air-assisted cell, or a fuel cell. The battery employs the fluid regulating system for adjusting the rate of passage of fluid to the fluid consuming electrode (e.g., the air electrodes in air-depolarized and air-assisted cells) to provide a sufficient amount of the fluid from outside the cell for discharge of the cell at high rate or high power, while minimizing entry of fluids into the fluid consuming electrode and water gain or loss into or from the cell during periods of low rate or no discharge.

Preferably the fluid regulating system will have a fast response to changes in cell potential, a long cycle lifetime, a low operating voltage that is well matched to the cell voltage range on discharge, and a high efficiency. In addition, the regulating system will preferably have a low permeability to the fluids being managed in the closed position, open and close in proportion to the need for the active fluid in the cell, require only a very small amount of the total cell discharge capacity, have a small volume and be easy and inexpensive to manufacture and incorporate into or onto the cell, battery or device.

As used herein, unless otherwise indicated, the term "fluid" refers to fluid that can be consumed by the fluid consuming electrode of a fluid consuming cell in the production of electrical energy by the cell. The present invention is exemplified below by air-depolarized cells with oxygen reduction electrodes, but the invention can more generally be used in fluid consuming cells having other types of fluid consuming electrodes, such as fuel cells. Fuel cells can use a variety of gases from outside the cell housing as the active material of one or both of the cell electrodes.

As described further below with respect to FIGS. 1-3, a battery 10 is shown including a fluid consuming cell 20 and a fluid regulating system 50. The fluid regulating system 50 regulates the flow of fluid to the fluid consuming electrode(s) of fluid consuming cell 20. For an air-depolarized cell, the fluid regulating system is disposed inside or outside of a cell housing 30 of fluid consuming cell 20 and on the air side of the oxygen reduction electrode (i.e., the side of the oxygen reduction electrode that is accessible to air from the outside of the cell housing).

Figure 12:
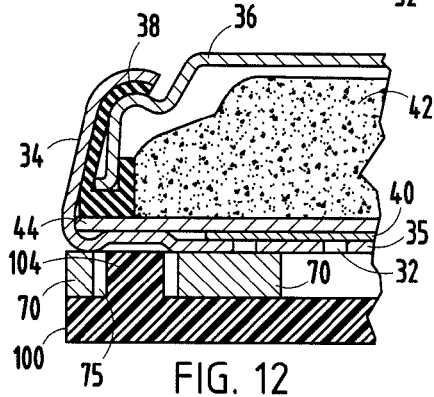
FIG. 12 is a partial cross-sectional view of one possible implementation of the alternative battery construction shown in FIG. 11.

A first embodiment of a battery 10 is shown in FIGS. 1-3. As shown, fluid consuming cell 20 (in this case an air-depolarized cell) includes a cell housing 30, which includes a first housing component and a second housing component, which may include a can 34 and a cover 36, respectively, or may have shapes or sizes differing from what would otherwise be considered a can or cover. For purposes of example, the first housing component is hereinafter referred to as can 34, while the second housing component is hereinafter referred to as cover 36. Can 34 and cover 36 are both made of an electrically conductive material, but are electrically insulated from one another by means of a gasket 38 (FIG. 12). Can 34 generally serves as the external positive contact terminal for the fluid consuming cell 20, whereas cover 36 serves as the external negative contact terminal. As discussed further below, cell 20 further includes a first electrode 40, which may be the fluid consuming electrode or air electrode, a second electrode 42, which may be the negative electrode (i.e., anode), and a separator 44 disposed between the first and second electrodes (see FIG. 12). First electrode 40 is preferably electrically coupled to can 34, whereas second electrode 42 is preferably electrically coupled to cover 36.

Can 34 includes a bottom surface 35 in which a plurality of fluid entry ports 32 are provided such that fluid may pass to the interior of cell housing 30 so as to reach the fluid consuming electrode 40 (see FIG. 12).

In the embodiment shown in FIGS. 1-3, the fluid regulating system 50 is secured to the exterior of bottom surface 35 of can 34. The particular manner by which fluid regulating system 50 may be attached to the exterior of cell 20 is discussed further below. In addition, further embodiments are described below in which fluid regulating system 50 is incorporated on the inside of fluid consuming cell 20.

The fluid regulating system 50 according to this particular embodiment may include a valve 60 including a first plate 62 (which may correspond to bottom surface 35 of can 34) having a plurality of apertures 64 (which may correspond to fluid entry ports 32), and a movable second plate 66 including a plurality of apertures 68 that correspond in size, shape, number, and position to apertures 64 formed in first plate 62. The size, shape, number, and position of apertures 64 and 68 are preferably optimized to provide the desired volume and distribution of fluid applied to the fluid consuming electrode. The size, shape, number and relative location of apertures 64 do not have to be the same as the size, shape, number and relative location of apertures 68. For example, if apertures 64 are slightly different in size from apertures 68, precise alignment of apertures 64 and 68 is not essential to achieve the maximum total open area through plates 62 and 66.

Figure 5A:
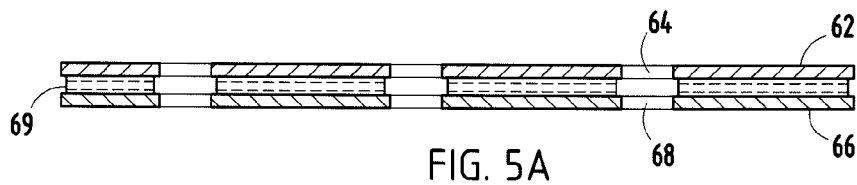
FIGS. 5A and 5B are partial cross-sectional views illustrating the valve of the fluid regulating system in open and closed positions.
Figure 5B:
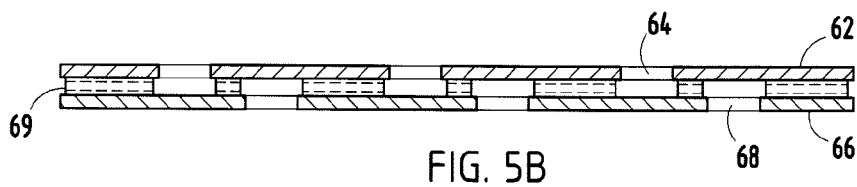

Fluid regulating system 50 may further include a chassis 70 having an annular body portion 72 with an opening 74 in which second plate 66 is disposed. Opening 74 is preferably shaped and sized to contact the elongated side edges of plate 66 while providing excess space at the shorter side of plate 66 such that plate 66 may be slid linearly along an axis in parallel with its longest dimension. Thus, as shown in FIGS. 5A and 5B, the apertures 68 of second plate 66 may be moved into and out of alignment with apertures 64 of first plate 62 to thereby open and close valve 60. The chassis is preferably configured as further discussed below, to guide and possibly retain second plate 66 adjacent the first plate 62. As shown in FIGS. 5A and 5B, a lubricating layer 69 made of oil or TEFLON® may be disposed between plates 62 and 66 to enable second plate 66 to more readily slide along the surface of plate 62. Thus, lubricating layer 69 enables the valve to be opened and closed requiring less force by the actuator. In addition, because it may be difficult to get the surfaces of plates 62 and 66 to be sufficiently smooth so as to provide a good seal, the lubricating fluid 69 may be utilized to enhance the sealing characteristic of the valve without requiring complex and expensive machinery of the plates to otherwise further smooth their surfaces. Second plate 66 may be made of a magnetic material, such as that commonly used in the gaskets provided on refrigerators. By utilizing a magnetic plate 66, chassis 70 does not need to be configured so as to include any mechanism for otherwise holding plate 66 firmly against plate 62. The magnetic plate 66 is preferably a flexible magnet that can conform to the shape of adjacent plate 62. Magnetic plate 66 can be made from suitable magnetic material, such as a blend of ferromagnetic (e.g., barium/strontium ferrite) and elastomeric materials. The magnetic plate 66 can be a permanent magnet that does not consume energy from the cell 20 to maintain sufficient magnetic force. In the embodiments shown in FIGS. 3 and 11, moveable second plate 66 can be constrained on the top and bottom by a lid 100 (as described further below) and bottom surface 35 of can 34. In an alternative embodiment, battery 10' has a fluid regulating system 50' shown in FIGS. 23 and 24. The chassis 70' is taller than chassis 70 in FIGS. 3 and 11. This can facilitate the movement of fluid between the lid 100 and the moveable plate 66, thereby providing more uniform distribution of fluid across the surface of plate 66 and more uniform flow of fluid through apertures 68 and 64 when plates 66 and 62 are aligned in an open position.

Chassis 70' can include an inward extending ledge 71, creating a race or groove 73 within which plate 66 can slide. The vertical position of ledge 71 can be selected to create a race 73 of the desired dimensions to hold plate 66 firmly enough against surface 35 to provide a good seal when plates 66 and 62 are aligned in a closed position but not so tightly as to interfere with the desired sliding motion of plate 66. Ledge 71 can be an integral part of chassis 70', or it can be a separate component. For example, ledge 71 can be in the form of a flat washer or strip insert molded into the chassis body 72', or it can be a separate component affixed to the chassis body 72'. The ledge 71 can be made of the same material as chassis body 72' or a different material. Materials for the chassis body 72' and ledge 71 can be selected to provide both the desired strength and smooth sliding of plate 66 within the race 73. If either the chassis body 72' or ledge 71 is made from an electrically conductive material, insulation from the electrical components of the actuator 80 and control circuit 90 may be required. As an alternative to a continuous ledge, a series of projections can be used.

The ledge 71 and/or chassis body 72' can also be modified to incorporate one or more additional structures, such as ribs extending across the opening 74' above plate 66, to hold the central portion of plate 66 flat. Alternatively, downward projections from the lid 100 can be used to hold the central portion of plate 66 flat.

Figure 25:
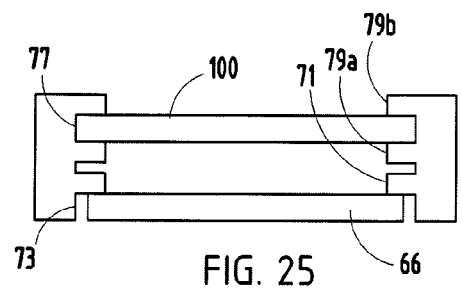
FIG. 25 is a cross-sectional view of a fluid regulating system in accordance with a fourth embodiment of the invention.

The chassis 70' can include a second race 77 in which the lid 100 is held, as shown in FIG. 25. This second race can be formed by one or more additional ledges 79a and 79b. This arrangement can facilitate pre-assembly of the lid and components of the fluid regulating system, to be added to the fluid consuming cell at another step in the manufacturing process. In another embodiment in which the stationary plate 62 is not a surface 35 of the can 34, the chassis 70' can include another ledge (not shown) below ledge 71, forming a larger race that retains the stationary plate 62 as well as movable plate 66.

Figure 23:
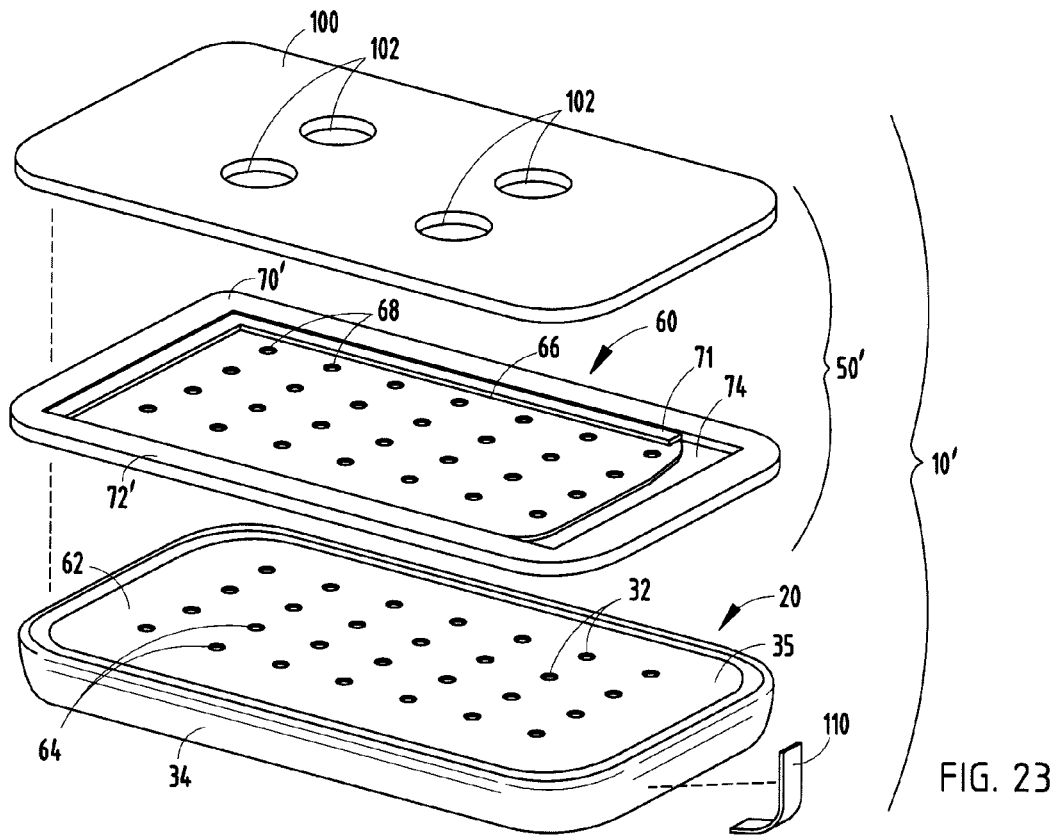
FIG. 23 is an exploded perspective view of a battery in accordance with a third embodiment of the invention, with the fluid regulating system actuators and control circuit not shown.
Figure 24:
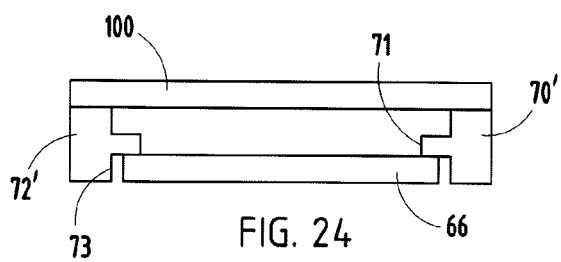
FIG. 24 is a cross-sectional view of the fluid regulating system of the battery shown in FIG. 23, as viewed from the right side.

The ledge 71 of chassis 70' can be a continuous ledge extending around the entire perimeter of opening 74', or it can be a discontinuous ledge extending along only part of the perimeter, as shown in FIG. 23. If the discontinuous ledge is suitably located and the moving plate 66 is sufficiently flexible, if the pressure within the cell becomes excessive, the edge of the moving plate 66 can bow outward between the ends of the discontinuous ledge 71 to provide a passageway between the plate 66 and both plate 62 and chassis frame 72' through which gases can escape to the external environment when the valve is partially open or closed. In such embodiments the plate 66 preferably has spring-like properties so that when the internal cell pressure is sufficiently reduced, the plate 66 will again conform to the shape of the surface 35 of the can 34.

In an alternative embodiment in which the lid serves as the stationary valve plate and the moveable plate is disposed adjacent to the lid, the chassis can include a ledge to hold the moveable plate against the lid while maintaining a space between the moveable plate and the surface of the can bottom, to facilitate uniform air distribution to the apertures in the can. As described above, this embodiment can also include a second race in the chassis in which the lid is held.

The fluid regulating system can be actuated in response to the voltage of the fluid depolarized cell, as described below, or it can be actuated by the user, or a combination of methods can be used. For example, when the user of a device powered by the cell device turns the device switch to the on position, the valve can be initially opened by mechanical action, and when the user turns the device switch to the off position, the valve can be initially closed by mechanical action. While the device switch remains in the on position, a control circuit can control the operation of the valve. In another example, when the device is turned on, power from the cell can be applied to the fluid regulating system to initially open the valve, and when the device is turned off, the valve can be actuated to close.

An actuator is preferably provided as a part of fluid regulating system 50 to actuate valve 60. The actuator may include a control circuit 90 that senses the voltage of fluid consuming cell 20 and which generates a control signal in response to the detected cell voltage. Circuit 90 may be an application specific integrated circuit (ASIC), which is preferably mounted on a surface of chassis 70. The body 72 of chassis 70 is preferably made of a non-conductive material such that tracings 96 and 98 may be printed on a surface of the chassis as further discussed below. Chassis 70 may thus be a printed circuit board. The chassis could be molded or shaped and most or all of the electrical connections could be pressure contacts to minimize the complexity of assembly. The chassis may, however, require some machining, and some electrical connections may require some soldering or welding. The selection of the chassis material may be based on its compatibility with its multi-functional use as a frame to house the valve, as a printed circuit board for the electronics, and for its ability/compatibility to be secured to or against the cell, battery casing or device. A strategic depression may be provided in and/or on a laminar structure of the chassis for mounting the control circuit 90. This can allow mounted parts to be maintained flush with the surface of the chassis to facilitate assembly with the cell. It is also possible that it may become desirable to coat the printed circuit tracings, such as tracings 96 and 98, with a nonconductive material to prevent shorting if pressed against a metal lid 100 or can 34. Alternatively, one or more recesses may be provided in the chassis, such as by molding or machining, to accommodate all or a portion of one or more components of the control circuit and the actuator. These recesses can be useful to allow positioning of components in different locations on the chassis and anchoring of components that extend beyond the chassis frame, as described below.

As a platform for the electronics, it would be desirable for the base material of chassis 70 to be an existing PCB material. The most common base materials contain epoxy resins and fiberglass reinforcement. It may be desirable for chassis 70 to be of laminar construction to integrate and protect the electronic circuit components, as well as to maintain a flush surface, parallel with bottom surface 35 of can 34. As described above, the inside diameter of the chassis may utilize a metal race for durability to house sliding valve plate 66. The race may "lock" plate 66 in place (so it does not fall out), provide enough axial force to prevent the valve from separating during use but insufficient force to prevent plate 66 from sliding. The chassis may thus be formed, molded, or machined, dependent on the material selection, so as to achieve the valve race shape, whether metal or not, to flush mount a chip and to generate vias (through-holes). There may be conductive circuitry within the vias, on one side and an edge of a chassis if mounted external to the cell, or on both sides of chassis 70 if mounted internal to the cell.

A conductive pathway for circuit 90 may be provided on both sides of chassis 70 and within the vias. This may be accomplished by a plating process or screen printing a conductive paste, especially to fill the vias. Conductive foil could be applied to the substrate at formation and the unwanted portion etched away. Copper is the most common material used. It may require multiple layers and multiple materials to assure adherence to the substrate depending on the base material utilized.

One method of attaching an ASIC serving as control circuit 90 is to use a direct method, as opposed to a packaged chip, due to volume constraints. Common methods of direct chip attachment include wire bonding, flip chip and other known techniques. According to one embodiment, wire bonding could use wires about 0.02 mm (0.0008 inch) in diameter that are bonded to the four to six chip pads and the circuit substrate. According to a flip chip embodiment, the packaged flip chip may be attached with solder bumps that form the physical and electrical connections. The chip and wire bonds may be encapsulated in non-conductive epoxy for protection. With a flip chip attachment, the pads may be pre-finished with a Pb/Sn solder and, in turn, soldered to the substrate. Once attached, the chip may be encapsulated with non-conductive epoxy to provide protection.

Figure 4:
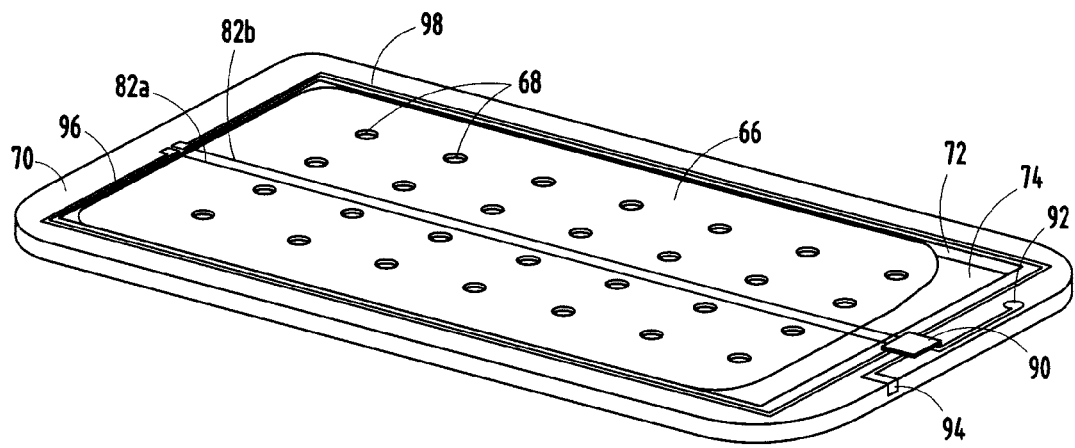
FIG. 4 is a perspective view of the first construction of a fluid regulating system useful in the battery shown in FIGS. 1 and 16.

In the embodiment shown in FIGS. 3 and 4, the actuator further includes a plurality of shape memory alloy (SMA) components that particularly include a first SMA wire 82*a* and second SMA wire 82*b*. The SMA wires are secured at either end of the chassis 70 and are electrically coupled to tracings 96 and 98, which extend from control circuit 90 to an opposite side of chassis 70. By supplying a control signal that passes a current through SMA wires 82*a* and 82*b*, the control circuit 90 may cause the SMA wires to heat up, which causes the SMA wires to expand or constrict to a particular length. This in turn causes the SMA wires 82*a* and 82*b* to pull second plate 66 in one direction or opposite direction and thus causes plate 66 to slide in and out of an open or closed position so as to selectively allow fluid (e.g., air) to pass into the interior of cell housing 30.

As shown in FIG. 4, two contact terminals 92 and 94 are provided on chassis 70 for connection to the positive and negative terminals of cell 20. The contact terminals 92 and 94 may be provided on any surface of chassis 70, and as discussed below, it may be preferable to provide one of the contact terminals, particularly terminal 94, on an outer facing edge surface of chassis 70 such that it may be exposed to the outside of the battery assembly for subsequent connection to the cover 36 of cell 20. Contact terminal 92, on the other hand, may best be provided on an inner surface that is either pressed into electrical contact with a conductive portion of lid 100 or on the opposite surface in electrical connection with the bottom surface 35 of can 34. The manner by which electrical connections of contact terminals 92 and 94 are made to can 34 and cover 36 of cell 20 are discussed further below.

As shown in FIG. 3, fluid regulating system 50 may further include a lid or cover 100 that extends over and optionally around chassis 70 to protect and shield fluid regulating system 50. Lid 100 preferably includes one or more holes 102 to allow fluid to pass from the outside to valve 60 for selective passage into cell 20. As mentioned above, lid 100 may serve as first plate 62.

In one embodiment, the valve 60 is in an open condition when a current is applied indicating that cell 20 is in use, and is closed when a current is not applied indicating that the cell is not in use. In the embodiments discussed with respect to FIGS. 3, 4, 6, 11, 26 and 27A-D the SMA wires 82*a*-82*e* pull, but do not push the second valve plate 66. Thus, in FIGS. 3 and 4 first SMA wire 82*a* pulls the valve open, whereas second SMA wire 82*b* pulls the valve closed. The SMA wires 82 may be disposed in parallel and are provided in a symmetric fashion about a center point of the valve plate 66 so as to supply an even force to prevent plate 66 from binding within chassis 70. In general, when the current applied to the SMA wires is provided from the cell it can be advantageous for current to be applied only to initiate movement of the actuator and not while the actuator is in a static condition in order to prevent unnecessary use of cell capacity. As shown, the SMA wires may be mounted to extend substantially parallel to one another. The SMA wires may also be mounted to extend parallel to the direction in which plate 66 moves (see e.g., FIG. 3) or perpendicular to the direction in which plate 66 moves (see e.g., FIGS. 6, 7 and 8).

SMA wires may be made with any conventional shape metal alloy. A shape memory alloy is an alloy that can be deformed at one temperature but when heated or cooled returns to its previous shape. This property results from a solid phase transformation, between the Martensite and Austenite phases. Preferred shape memory alloys have a two-way shape memory; i.e., the transformation is reversible, upon both heating and cooling. Examples of shape memory alloys include nickel-titanium, nickel-titanium-copper, copper-zinc-aluminum and copper-aluminum-nickel alloys. The use of nickel-titanium-copper (e.g., with about 5-10 weight percent copper) can be advantageous for actuators that may be operated many times because of its resistance to fatigue. Manufacturers of nickel-titanium and other shape memory alloys include Specialty Metals, Shaped Memory Alloy Division (New Hartford, N.Y., USA), Memory Corporation (Bethel, Conn., USA), and Dynalloy, Inc. (Mesa, Calif., USA).

Figure 6:
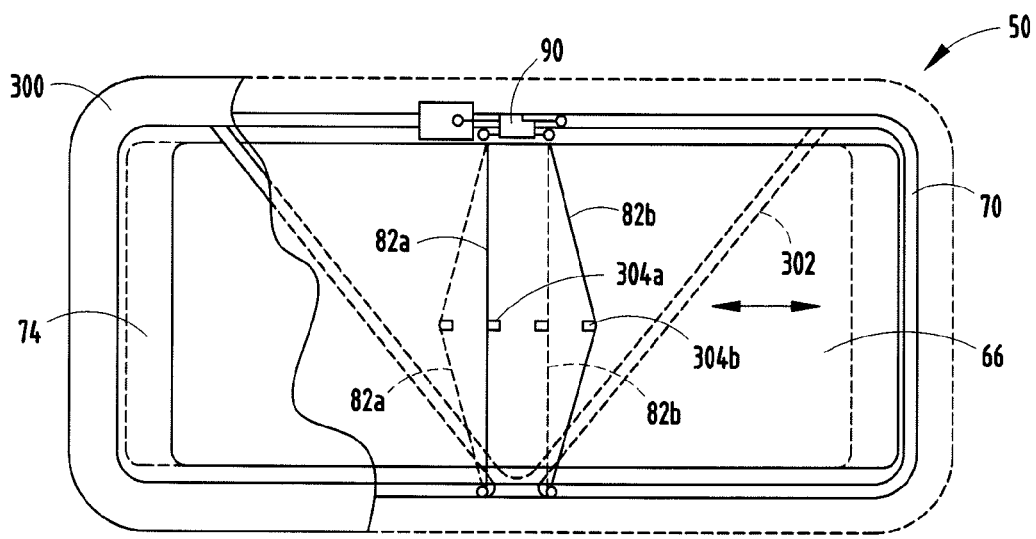
FIG. 6 is a top view of a fluid regulating system employing another actuator construction and an overmolded chassis useful with the present invention.
Figure 7:
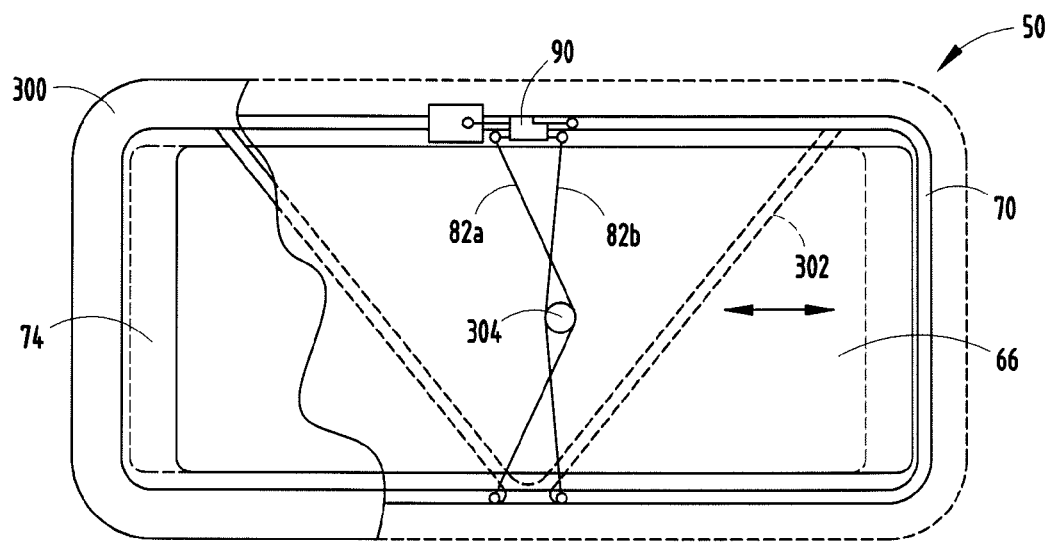
FIG. 7 is a top view of a fluid regulating system employing an actuator with a single pin, according to another embodiment.

FIG. 6 shows another manner to attach to SMA wires 82*a* and 82*b* in order to move plate 66. According to this variation, SMA wires 82*a* and 82*b* are not provided to extend along the longest dimension of the plate 66, they instead are substantially perpendicular to the direction of movement of plate 66. The first wire 82*a* may be heated to cause first wire 82*a* to contract, while second wire 82*b* is not heated allowing that wire to flex. Thus, the plate 66 may be shifted in a first direction (to the right in FIG. 6 as shown with solid lines). To move the plate in the opposite direction (i.e., to the left), a current may be removed from wire 82*a* thus allowing wire 82*a* to cool and flex, while a current may be applied to wire 82*b* thus heating wire 82*b* and causing it to contract. This causes the plate and wires to move to the position shown in dashed lines in FIG. 6.

The chassis 70 is shown having control circuit 90 and circuit traces formed on the top surface of the chassis body 72. Additionally, the SMA wires 82*a* and 82*b* are attached to a top surface of the chassis 70 in electrical contact with the circuit traces. The chassis 70 is further shown in FIG. 6 having an overmold body 300 formed over the control circuit 90 and circuit traces so as to encapsulate and protect the components provided on chassis 70. Thus, the overmold body 300 serves as part of the chassis 70. The overmold body 300 may include a non-conductive epoxy or other overmolding material. Additionally, the overmold body 300 is further shown including integrally formed ribs 302 which extend across the opening 74 above moving plate 66. The ribs 302 are shown formed in a generally V-shape and serve to hold the central portion of the moving plate 66 flat above the underlaying fixed plate 62. In one embodiment, the fixed plate 62 is connected to the bottom side of chassis 70 or its overmold body 300 and the battery cell is connected to the top side of the overmold body 300 of chassis 70.

In the embodiment shown in FIG. 6, the first and second SMA wires 82a and 82b engage separate actuator pins 304a and 304b, respectively, which are connected to the moving plate 66. In the embodiment shown in FIG. 7, a single actuator pin 304 may be utilized in the fluid regulating system 50. With a single actuator pin 304, the first SMA wire 82a engages one side of pin 304, while the second SMA wire 82b engages the opposite side of pin 304, such that SMA wires 82a and 82b actuate pin 304 in opposite directions to move plate 66 left and right to open and close the valve. In this embodiment, the actuator pin 304 may include wire receiving portions, such as detents or slots, at different elevations to engage the corresponding SMA wires 82a and 82b at different heights, such that the SMA wires 82a and 82b do not contact or otherwise interfere with each other.

Figure 8:
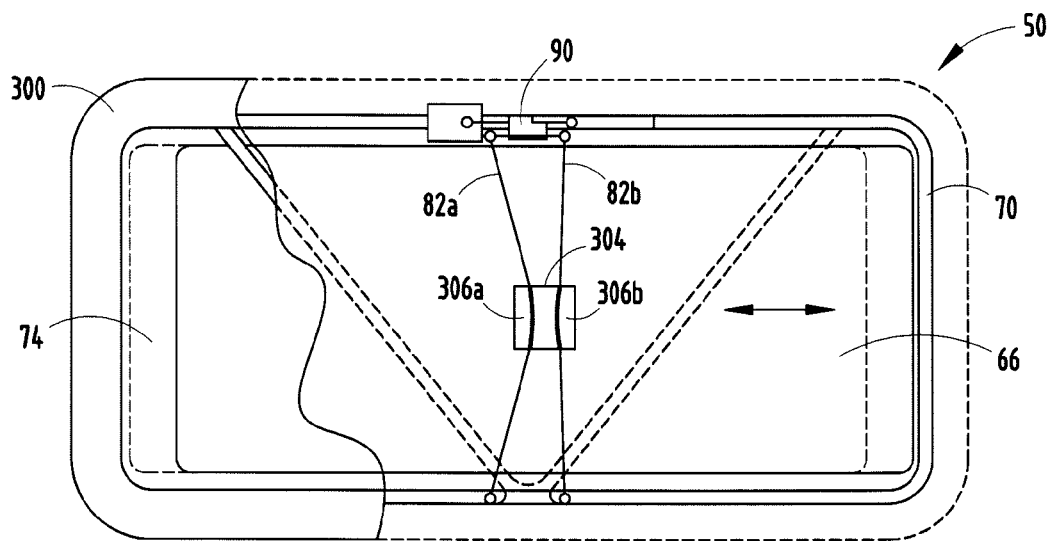
FIG. 8 is a top view of a fluid regulating system employing an alternate pin actuator assembly.

Referring to FIG. 8, an alternate actuator pin 304 is shown employed in a fluid regulating system 50, according to another embodiment. Pin 304 is shown including first and second portions 306a and 306b that are elevated above the remainder of the generally rectangular pin 304 such that the SMA wire 82a engages portion 306a and SMA wire 82b engages portion 306b. Portions 306a and 306b may include upstanding members as shown. Alternately, portions 306a and 306b may include slots formed within a pin or other structure 304. Accordingly, single or multiple actuator engagement structures may be employed to allow the SMA wires 82a and 82b to actuate the moving plate 66 in either direction to open and close the valve.

Figure 9A:
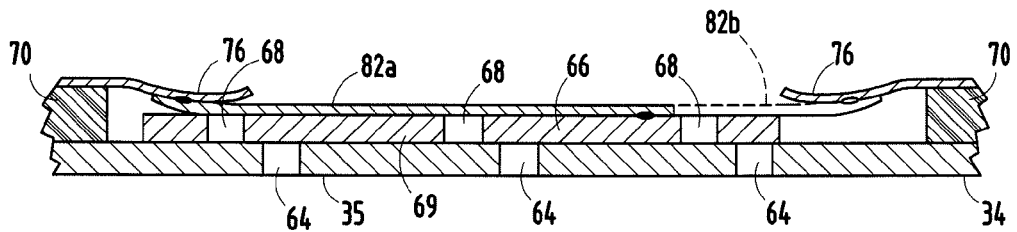
FIGS. 9A and 9B are cross-sectional views of the portion of the battery including the valve as used in one embodiment of the present invention.
Figure 9B:
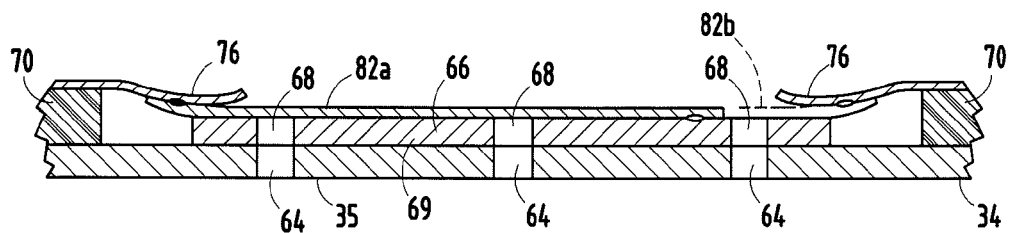

FIGS. 9A and 9B show two side views of valve 60 used adjacent an outer surface of can 34. FIG. 9A shows a cell at rest in which case valve 60 is closed so that the apertures 64 and 68 do not align. FIG. 9B shows the position of the valve's second plate 66 when moved into an open position which would occur when the cell is in use. This causes apertures 64 and 68 to align and thereby allows fluid to pass into the interior of the cell. As illustrated, SMA wires 82a and 82b may be attached to chassis 70 by means of a pair of spring contacts 76 to which the SMA wires may be crimped, clamped, soldered or welded.

Figure 10:
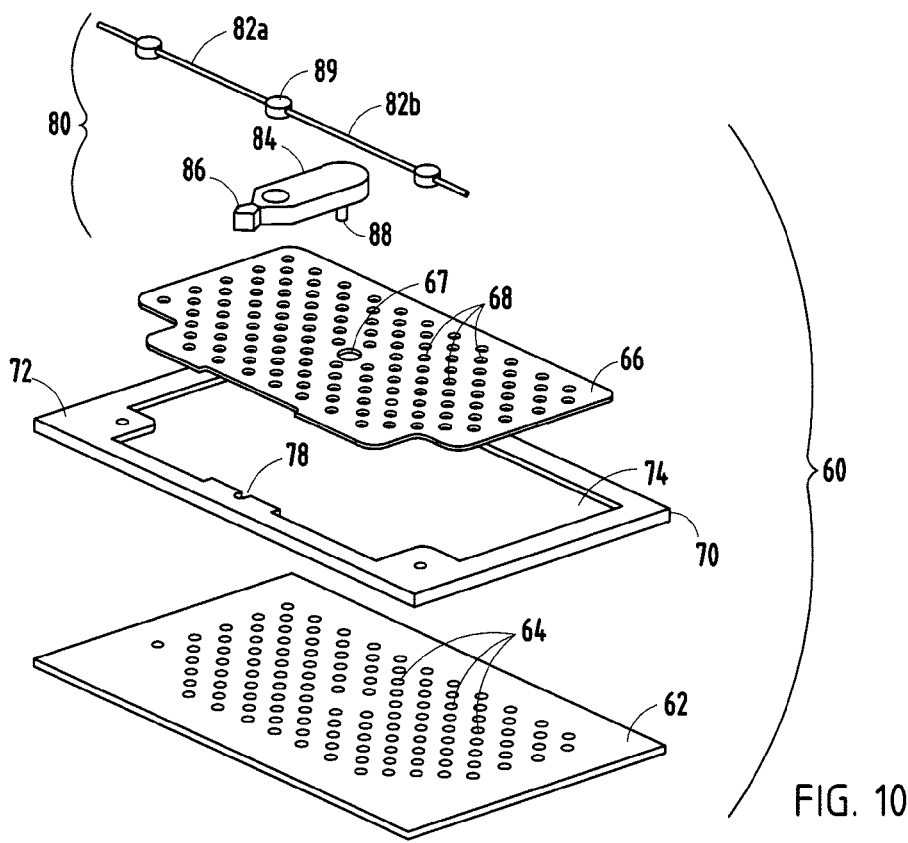
FIG. 10 is an alternative construction of a fluid regulating system that may be used in the various embodiments of the present invention.

FIG. 10 shows another embodiment of valve 60 that may be utilized in various embodiments of the present invention. Valve 60 includes first plate 62 including a plurality of apertures 64. Plate 62 may be a separate plate that is held stationary relative to chassis 70 or may be a portion of the can or cover of a cell housing 30. Plate 62 may be made of metal, which may be magnetic or non-magnetic. Valve 60 further includes second plate 66 including a plurality of apertures 68 that correspond in number, size, shape, and position to apertures 64 and first plate 62. Plate 66 may be a magnetic or non-magnetic metal. Similar to the embodiments discussed above, a chassis 70, which preferably is made of an electrically non-conductive material, includes an annular body 72 with a central opening 74 for receiving plate 66. Opening 74 is configured to be slightly larger than plate 66 in one direction so as to enable plate 66 to slide linearly relative to plate 62 such that apertures 64 and 68 may be moved into and out of alignment to open and close valve 60. The implementation shown in FIG. 10 differs from the implementations discussed above insofar as a lever arm 84 is utilized as a part of actuator 80. Lever arm 84 includes a pivot pin 86 that is received in an aperture or a slot or recess 78 formed in chassis 70 such that lever arm 84 may be pivotably secured to chassis 70. This may be done, for example, by enlarging and reshaping the recess 78 to fit around pivot pin 86 and partially extend into the necked area between the pivot pin 86 and the body of lever arm 84 in such a way as to capture pivot pin 86 within the recess 78 but still allow the lever arm 84 to pivot within the recess 78. Other means of securing the pivot pin 86 to the chassis may be used, such as a downward projection from pivot pin 86 that is received in a hole in a ledge at the bottom of the recess 78. An actuator pin 88 preferably extends downward from the body of lever arm 84 such that it may be received in a hole 67 formed in second plate 66. This allows lever arm 84 to engage plate 66 and thus to slide second plate 66 relative to first plate 62. In this particular configuration, a pair of SMA wires 82a and 82b is attached via an attachment point 89 to a top surface of lever arm 84. The other ends of wires 82a and 82b may be attached to chassis 70. Wires 82a and 82b can be secured to recesses in the chassis, similar to recess 78, for example. They can be secured in any suitable manner, such as with adhesives, with pins or by fitting enlarged heads into recesses with restricted openings. The SMA wires are electrically coupled to a control circuit (not shown in FIG. 10) that selectively applies a current to SMA wires 82a and 82b in response to a sensed cell voltage. In this manner, SMA wires 82a and 82b may pull the lever arm in either of two opposing directions thus causing lever arm 84 to slide second plate 66 relative to first plate 62. In this case, chassis 70 serves as a mounting location for the pivot point of lever arm 84 and of the ends of SMA wires 82 while also providing a guide for guiding plate 66 relative to plate 62.

Other arrangements of SMA wires and levers can be used to operate a valve in a fluid regulating system. For example, SMA wires 82a and 82b can be attached to lever arm 84 via two separate attachment points rather than a single attachment point 89.

Figure 28:
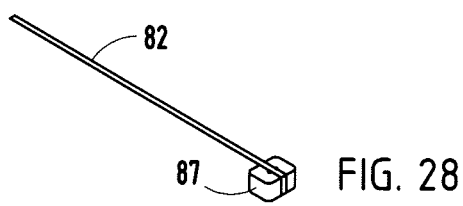
FIG. 28 is a perspective of an SMA wire fastened to a connector.

SMA wires can be connected to components of a fluid regulating system in any suitable manner. In one embodiment one or both ends of an SMA wire 82 are captured within a suitably sized connector 87, as shown in FIG. 28. Preferably the SMA wire 82 is crimped into the connector 87. Optionally the wire can be glued, welded or soldered to the connector before or after crimping. The connector can then be inserted into a corresponding aperture in the component (e.g., chassis 70 or lever arm 84) to connect the SMA wire 82 to that component. Preferably the connector 85 is electrically conductive and can make electrical contact between the SMA wire 82 and a portion of the control circuit disposed on the surface of the component defining the aperture. The connector 87 can be held in place within the aperture by an interference fit, an electrically conductive adhesive, solder or a weld, for example.

In embodiments in which a control circuit is used to restrict the flow of current through the SMA wire(s) to only the time required to move the valve to an open or closed position, the SMA wires can return to their original length (e.g., elongate) after the current flow is stopped. When this happens, the SMA wires may not hold the plate in the desired position, allowing it to slide to a partially open or partially closed position, for example. This is particularly true when there is an opposing SMA wire for moving the sliding plate to another position; elastic tension from the unactuated opposing SMA can pull the sliding valve as the actuated SMA elongates following the cessation of current. In such situations, the sliding plate can be held in the desired position until the plate is intentionally moved from that position. An example of a means of retaining the sliding plate in a desired position is a latching mechanism. Any suitable mechanism can be used. In one embodiment a spring biased detent can cooperate with a projection from or a recess in a surface of the sliding plate. The spring force can be selected to be sufficient to keep the plate from sliding unintentionally but weak enough to be easily overcome by the action of an opposing SMA wire to slide the plate into another desired position.

In another embodiment, the sliding plate is kept from sliding unintentionally by friction between the sliding plate and another cell or fluid regulating system component. The friction between the plate and the other component is sufficient to prevent unintentional sliding but not so great as to interfere with the efficient movement to another position by action of an opposing SMA. The friction can be controlled through the selection of materials for the sliding plate and the other component, a coating applied to one or both parts, or the texturing of one or both of the adjacent surfaces.

Figure 11:
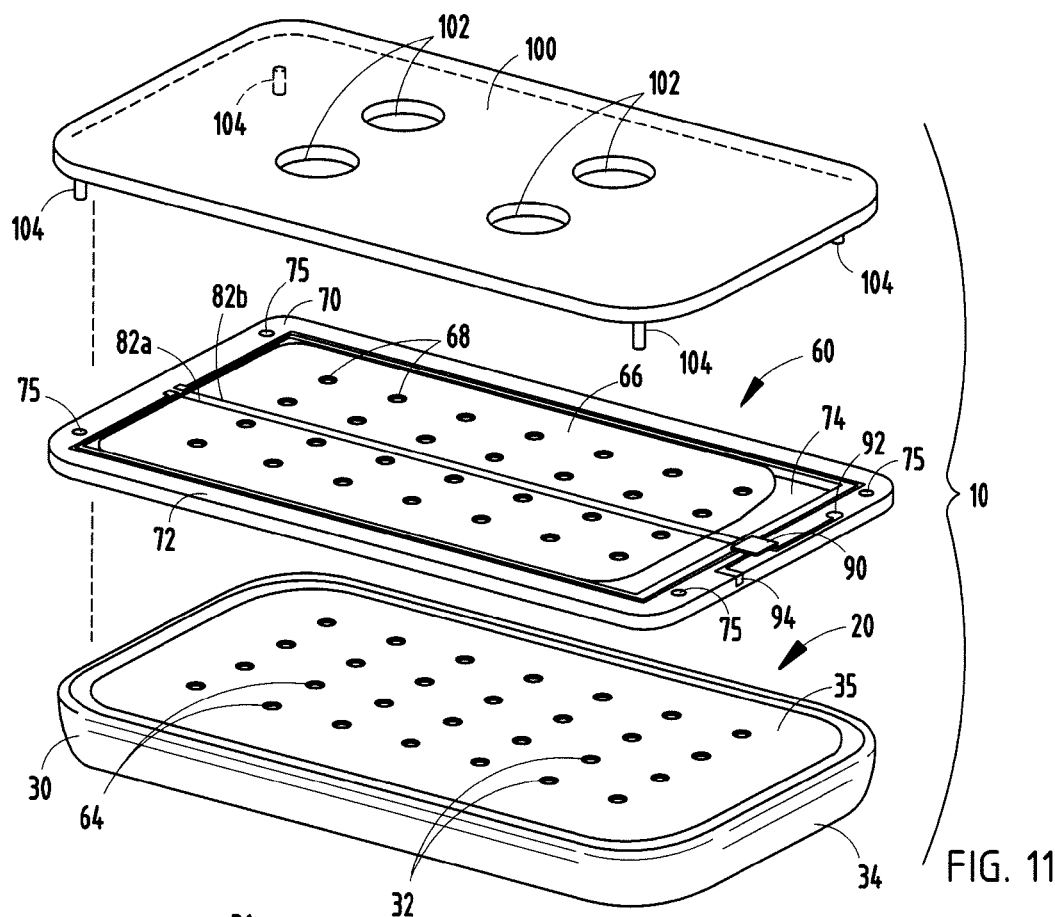
FIG. 11 is an exploded perspective view of a variation of the battery of the first embodiment of the present invention.
Figure 13:
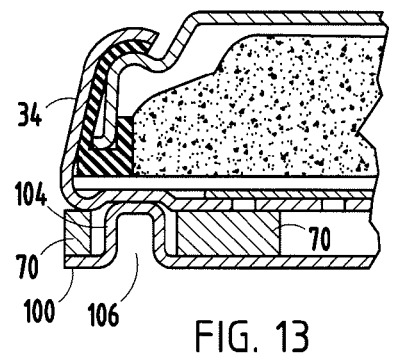
FIG. 13 is another possible configuration of the alternative battery construction shown in FIG. 11.

The fluid regulating system 50 may be secured to the exterior of cell 20 using a variety of techniques that are discussed below. As shown in FIG. 11, lid 100 may be configured to have a plurality of stand-offs 104 that extend downward from an inner surface of lid 100 and then pass through holes 75 in corresponding locations on chassis 70 such that the stand-offs 104 may be attached to bottom 35 of can 34. FIGS. 12 and 13 show two different constructions for the configuration shown in FIG. 11.

In FIG. 12, a configuration is shown whereby the lid 100 is formed of plastic. In this case, the stand-offs 104 may be ultrasonically welded to the bottom surface of can 34. In this case, there would be no electrical connection between the lid 100 and can 34.

In FIG. 13, the stand-offs 104 are provided as an indentation/protrusion 106 in a metal lid 100 which may be formed by stamping or the like. In this case, the metal lid 100 may be resistance- or laser-welded to the bottom surface 35 of can 34.

Figure 14:
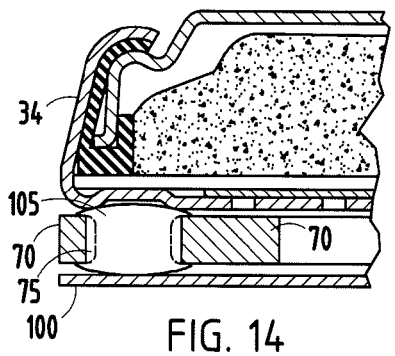
FIG. 14 is a partial cross-sectional view showing a different battery construction for the first embodiment.

FIG. 14 shows an alternative method of connecting chassis 70 and lid 100 to the exterior of cell 20. In this case, vias 105 are provided through the holes 75 of chassis 70 which serve to weld lid 100 to can 34. This weld also provides an electrical connection between lid 100 and cell 20.

Figure 15:
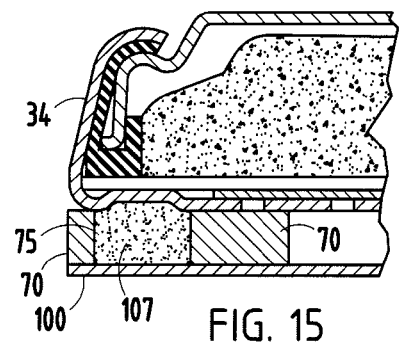
FIG. 15 is a partial cross-sectional view of yet another possible implementation of the battery according to the first embodiment.

FIG. 15 shows yet another technique whereby a metal lid 100 is secured to can 34 using a conductive epoxy 107 that is provided in the holes 75 of chassis 70. As yet another alternative, the fluid regulating system 50 may be secured to the bottom surface of can 34 using an adhesive, a combination of an adhesive and a label (not shown), by means of a press fit of the chassis into one or more grooves coined in the bottom surface of can 34, by such a press fit of the chassis in addition to utilizing an adhesive, by crimping can 34 within a second can where the second outermost can replaces lid 100, by soldering or welding a laminar chassis, or encapsulating the fluid regulating system 50 in an epoxy.

It should be appreciated that various other alternative actuators and valves may be employed in the fluid regulating system. Examples of various actuators and valves employed in a fluid regulating system are disclosed in U.S. patent application Ser. No. 11/860,117, filed on Sep. 24, 2007, the entire disclosure of which is hereby incorporated herein by reference. Although the use of SMA wires has been described above as being a preferred component of actuator 80, other components or materials may also be utilized, such as linear electrode-active polymers (EAPs) and bending electro-active polymers (EAPs), which are associated with artificial muscles. Such materials offer potential advantages including a simpler design, no or simplified electronics, and a proportional response to voltage. Examples of electro-active polymers (EAPs) are disclosed in U.S. patent application Ser. No. 11/852,516, filed on Sep. 10, 2007, the entire disclosure of which is hereby incorporated herein by reference.

Another consideration relates to the initial activation of the battery. The battery may be built with the valve in the open position and with holes 102 protected by a tab similar to conventional button air cells. Air-up after removal of the tab would activate the cell, initiate electronic control of the valve, and maximize the shelf life of the battery. Alternatively, the battery could be built with a functioning fluid regulating system. This would allow the battery to be immediately useable by the consumer but may also require suitable packaging and storage conditions in the warehouse, store shelves, etc. to prevent moisture ingress in humid environments and moisture egress in dry environments.

In the construction discussed above, the can 34 is proposed to act as the stationary plate 62 of valve 60. However, it may be desirable to provide a separate fixed plate 62 rather than utilizing can 34 such that the can bottom will maintain its hole pattern, but may act more like an air diffuser rather than an integral part of the valve assembly. In addition, the stationary plate 62 may be spaced apart from the can bottom such that if the can 34 bulges, bows, or possibly wrinkles, it will not disrupt the operation of the valve 60. It should be noted that the can 34 may be made with a stronger material, a greater thickness, or a different shape (e.g., ridges in the bottom). An additional advantage of utilizing a separate stationary plate 62 is that the valve 60 may be totally preassembled thus providing a greater stability of the lubricating fluid layer 69. This may come, however, at the cost of a thicker battery.

Although not illustrated in the drawing figures, a label may be provided to the outer surface of cell housing 30. Such a label may extend around the perimeter of the cell so as to further cover the electrical conductor tab 10 (discussed below) as well as the interfaces between the fluid regulating system 50 and cell 20 and to cover the interface between the can 34 and cover 36. Sufficient portions of the cover 36 and the can 34 and/or a conductive lid 100 could remain exposed to provide electrical contact terminals on the outside of the battery.

The particular cell construction illustrated in FIGS. 1-3 is a prismatic cell design. The construction differs from a conventional button-type air cell in the relative size and rectangular nature of this cell. Similar air electrodes, anodes, separators and can/cover materials may thus be utilized in cell 20 that are presently used in conventional air cells. It should be appreciated by those skilled in the art, however, that the cell 20 need not have the particular shape, size, or relative dimensions as that shown in the drawings.

Figure 16:
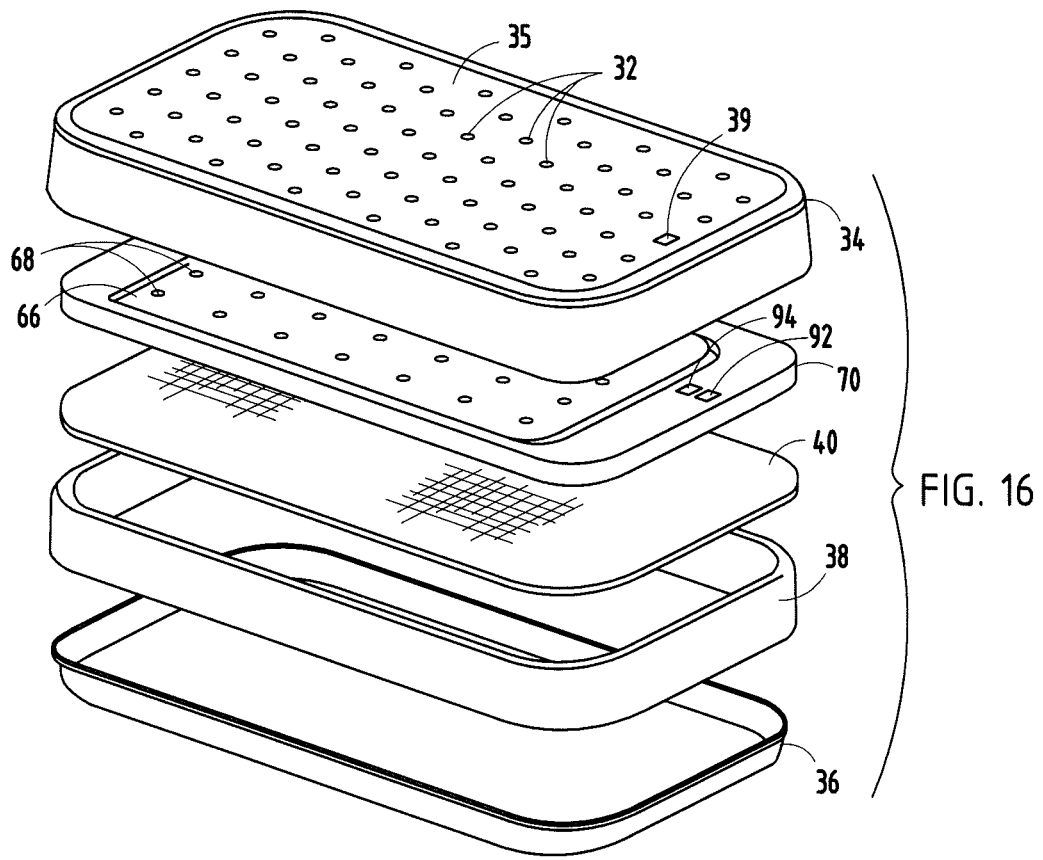
FIG. 16 is an exploded perspective view of a second embodiment of a battery constructed in accordance with the present invention.
Figure 17:
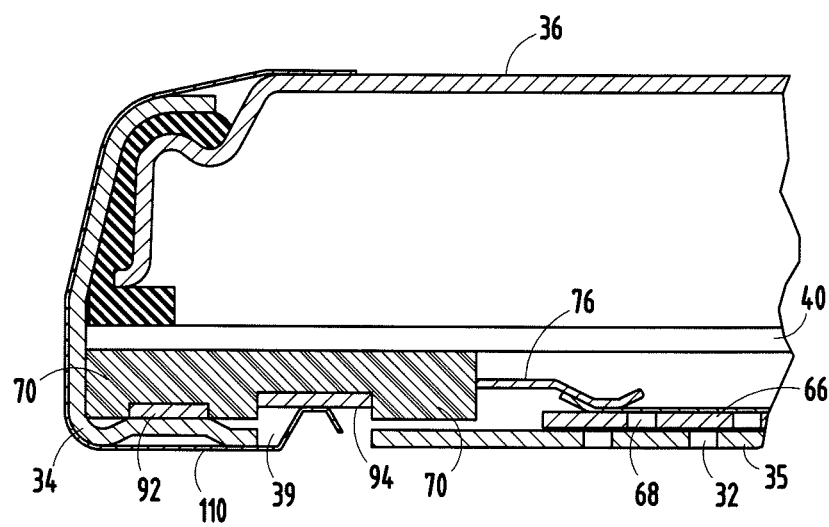
FIG. 17 is a partial cross-sectional view of the battery shown in FIG. 16.

FIG. 16 shows an alternative embodiment of the present invention whereby the fluid regulating system 50 is disposed in the interior of cell housing 30. FIG. 17 shows a cross-sectional view of a portion of this embodiment. As shown in these figures, the cell housing is constructed in a similar manner to that described above with the exception that the cell may be slightly thicker to accommodate the fluid regulating system 50 between air electrode 40 and the inner surface of can 34. In this embodiment, a chassis 70 may also be utilized along with a valve, actuator, and control circuit 90 as described above when applied to the exterior of the cell. Similarly, the bottom of can 34 may serve as first plate 62 of valve 60 and may include a plurality of fluid entry ports 32 which serve as apertures 64. This embodiment differs in that respect insofar as the second plate 66 slides along the inner surface of can 34 rather than the exterior surface. In this and other embodiments discussed below, the chassis 70 and hence the valve 60 may be held in place by gasket 38.

Figure 18:
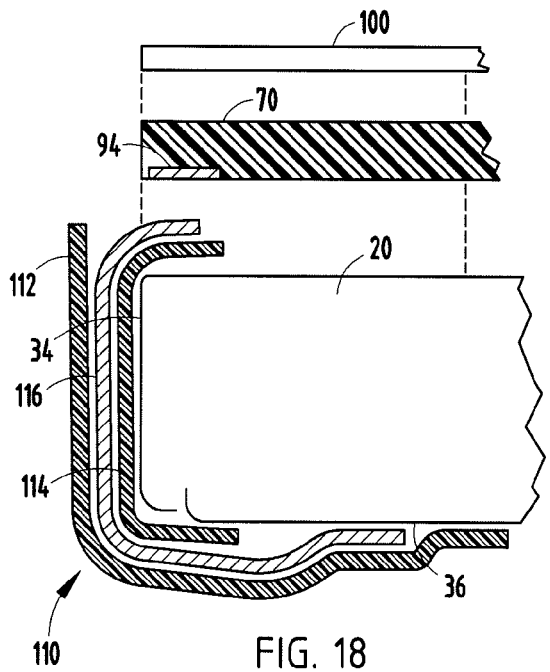
FIG. 18 is a cross-sectional view showing the details of an electrical contact tab that may be used with either the first or second embodiment of the present invention.

One other difference in the construction of the cell 20 when an internal fluid regulating system 50 is utilized is that the cell should be reconfigured to allow electrical connection of both the negative and positive contact terminals of the cell to the control circuit 90 of the actuator. One manner of making this electrical connection is shown in FIGS. 16-18. As shown in FIG. 16, a contact opening 39 is formed in the bottom surface 35 of can 34. As shown in FIG. 17, the negative contact terminal 94 is provided at a bottom of chassis 70 through a via in the chassis so as to be exposed through opening 39. In this manner, an electrical conductor 110 may be electrically connected to cover 36 of cell housing 30 and extend around the outside of cell 20 to the opening 39 while making electrical contact with contact terminal 94. This provides a connection to the negative terminal of the cell. As also shown in FIG. 17, the positive contact terminal 92 provided on chassis 70 may be positioned so as to contact an inner surface of can 34 so as to provide a connection to the positive terminal of the cell. As discussed above, contact terminals 92 and 94 may be electrically connected to a control circuit 90 for controlling the actuator to open and close the valve in response to a detected cell voltage or current draw.

As shown in FIG. 18, electrical conductor 110 may be a tab that includes a foil strip 112 that is disposed between two insulative layers, which prevent a short circuiting of the cell between can 34 and cover 36. A first insulative layer 114 may be disposed between the cell housing 30 and conductive foil 112. This insulative layer 114 may be made of double-sided tape. The second and outer insulative layer 116 may be disposed over the foil and may comprise a strip of single-sided tape. Although this particular external electrical connection is shown with respect to an internal fluid regulating system 50, the same electrical conductor 110 may be applied to provide an electrical path between cover 36 and a similar contact terminal 94 of the external fluid regulating system shown in FIGS. 1-3. In this case, an aperture similar to contact opening 39 could be formed in lid 100 or alternatively the electrical conductor 110 may simply extend between the interface between chassis 70 and can 34 or the interface between chassis 70 and lid 100.

Figure 19:
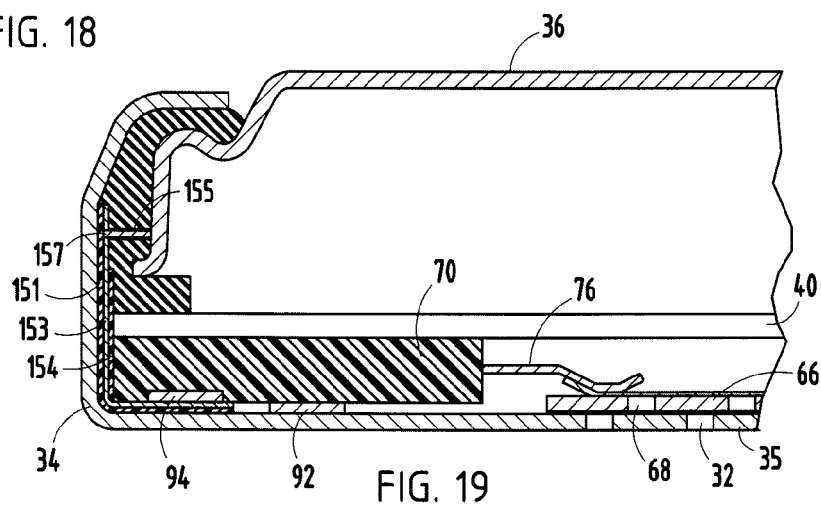
FIG. 19 is a partial cross-sectional view showing an alternative construction of a battery according to the second embodiment of the present invention.
Figure 20:
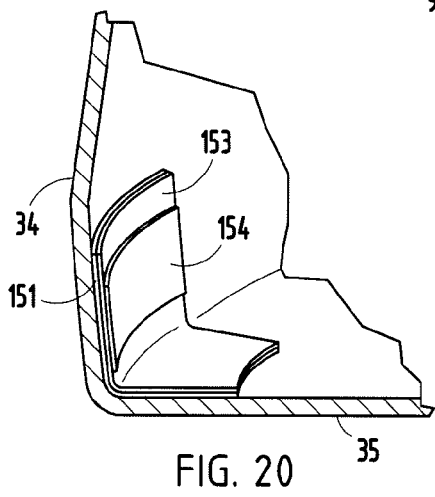
FIG. 20 is a partial perspective view of a modified can that may be used in the construction shown in FIG. 19.
Figure 21:
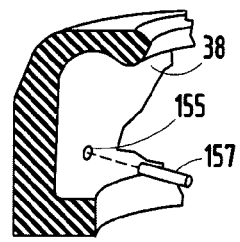
FIG. 21 is a partial perspective view of a gasket that may be used in the construction shown in FIG. 19.
Figure 22:
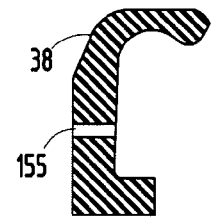
FIG. 22 is a cross-sectional view of a portion of the gasket shown in FIG. 21.

FIGS. 19-22 show yet another manner by which electrical connection may be made between cover 36 and terminal 94 on chassis 70. In this embodiment, a portion of the inner surface of can 34 is coated with three layers of materials as best shown in FIG. 20. The first layer is an electrical insulator layer 151, the second layer is an electrically conductive layer 153 that is applied over insulator layer 151 such that there is no electrical connection between can 34 and conductive layer 153, and the third layer is an electrically insulating layer 154 applied over a portion of conductive layer 153 to insulate the edge of the air electrode 40 from the conductive layer 153. As shown in FIG. 20, layers 151 and 153 extend around the inner bottom corner(s) of can 34 and extend over just enough of the bottom of can 34 so as to physically contact terminal 94 formed on the opposing surface of chassis 70. As mentioned above, chassis 70 may be pressed against the inner bottom surface of can 34 by gasket 38 so that the contact between conductive layer 153 and contact 94 is by way of such pressure. Layers 151 and 153 extend up a sidewall of can 34 between an interface of can 34 and gasket 38. As best shown in FIGS. 19, 21 and 22, gasket 38 may include an aperture 155 through which a rivet or pin 157 may extend. Rivet or pin 157 forms an electrical connection between cover 36 and conductive layer 153 through gasket 38, thereby completing the conductive path between cover 36 and contact 94 on chassis 70. Rivet/pin 157 may be molded in place in gasket 38. Further, more than one such rivet/pin 157 may be used. The rivet/pin 157 may have a length sufficient to allow for gasket compression. Layers 151, 153 and 154 are in the form of a strip as shown in FIG. 20 in order to allow the edge of the air electrode 40 to make electrical contact with the inside surface of the can 34. It should be appreciated that other electrical connections may be employed according to other embodiments.

As described above, the fluid regulating system can use electronic controls to operate the valve, based in part on the cell (or battery) voltage. However, a switch can be used to close an electrical circuit through an actuator that changes length to move the valve to an open or a closed position, with the circuit subsequently being broken to stop the flow of current through the actuator when the valve reaches the full open or closed position. This can eliminate the need for more complex control circuits, while still drawing energy from the cell only when needed to open or close the valve. The switch can be on or within the battery itself, or it can be a part of the device in which the battery is used. In one embodiment, the device on/off switch also alternately closes the circuits through opposing actuators to open and close the valve. The operation of such a fluid regulating system is illustrated in FIGS. 27A-27D.

Figure 27A:
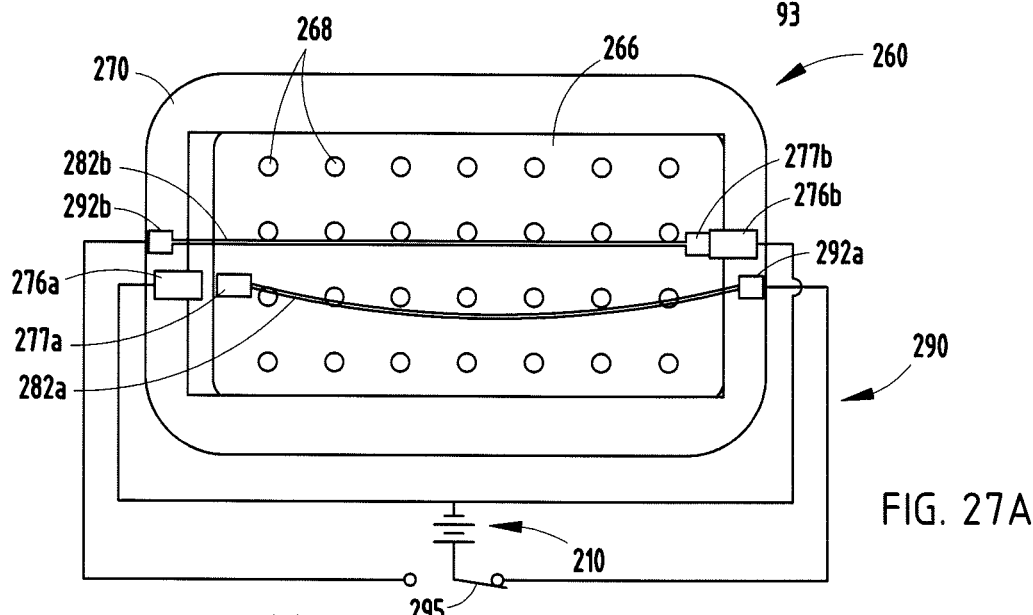
FIG. 27A is a top view of an embodiment of a valve in a closed position and including a schematic diagram of a portion of a control circuit.

FIG. 27A includes a top view of a valve 260 similar to the valve 60 shown in FIG. 3. Valve 260 includes a moveable plate 266 slidably disposed in a chassis 270. Moveable plate 266 is shown in FIG. 27A in the closed position (i.e., with apertures 268 out of alignment with apertures in a fixed plate). SMA actuators 282a and 282b are anchored to the moveable plate 266 and opposite ends of the chassis 270 and are used to pull the plate 266 open and closed, respectively. Actuators 282a and 282b are anchored to plate 266 via flat electrical contacts 277a and 277b, respectively, and to chassis 270 via electrical contacts 292a and 292b, respectively. Flat contacts 277a and 277b are located near opposite ends of the top surface of plate 266 so they will make electrical contact with spring contacts 276a and 276b, respectively, when the plate 266 is in the open and closed positions, respectively. Spring contacts 276a and 276b also serve as contact terminals for making connections to the remainder of a control circuit 290, which is represented schematically. The control circuit includes an on/off switch 295 and the fluid depolarized battery 210 for providing electrical energy to the device. When electrical energy is not required from the battery 210, the switch 295 is in the off position and the valve 260 is in the closed position, as shown in FIG. 27A. Because neither of the circuits including actuators 282a and 282b is closed, no current will flow through them, so the actuators 282a and 282b are at an ambient temperature and in an elongated condition.

Figure 27B:
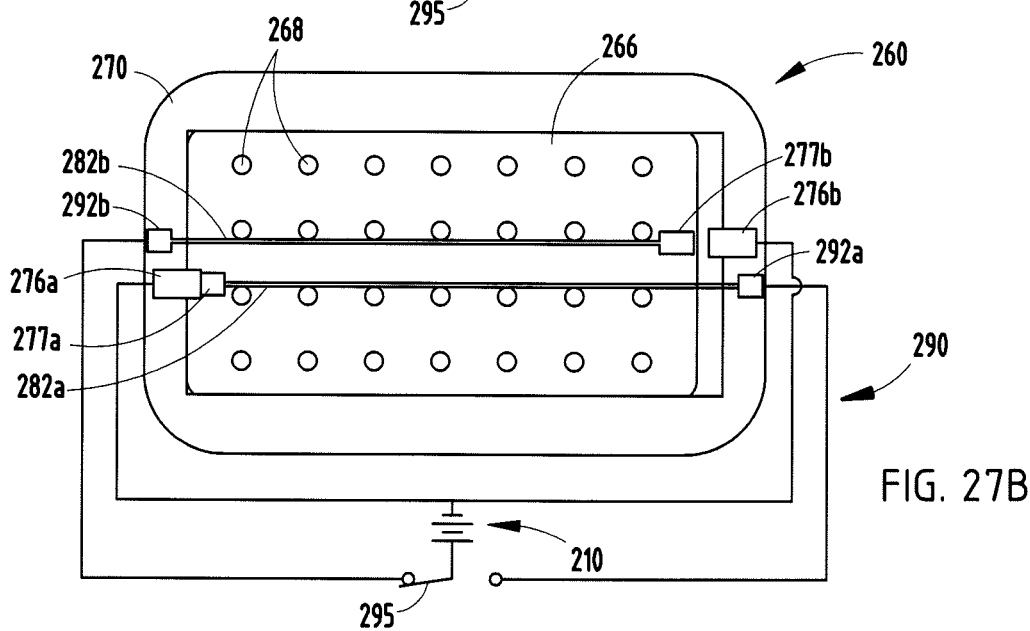
FIG. 27B is a top view of an embodiment of the valve shown in FIG. 27A, but with the valve in an open position.
Figure 27C:
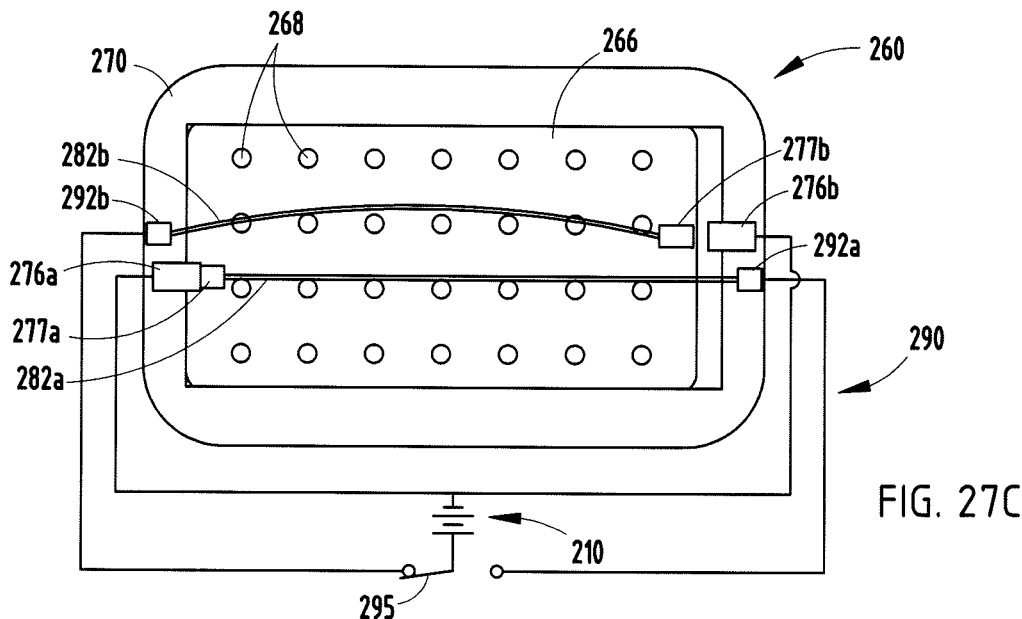
FIG. 27C is a top view of an embodiment of the valve shown in FIG. 27B, but with an actuator in an elongated condition.
Figure 27D:
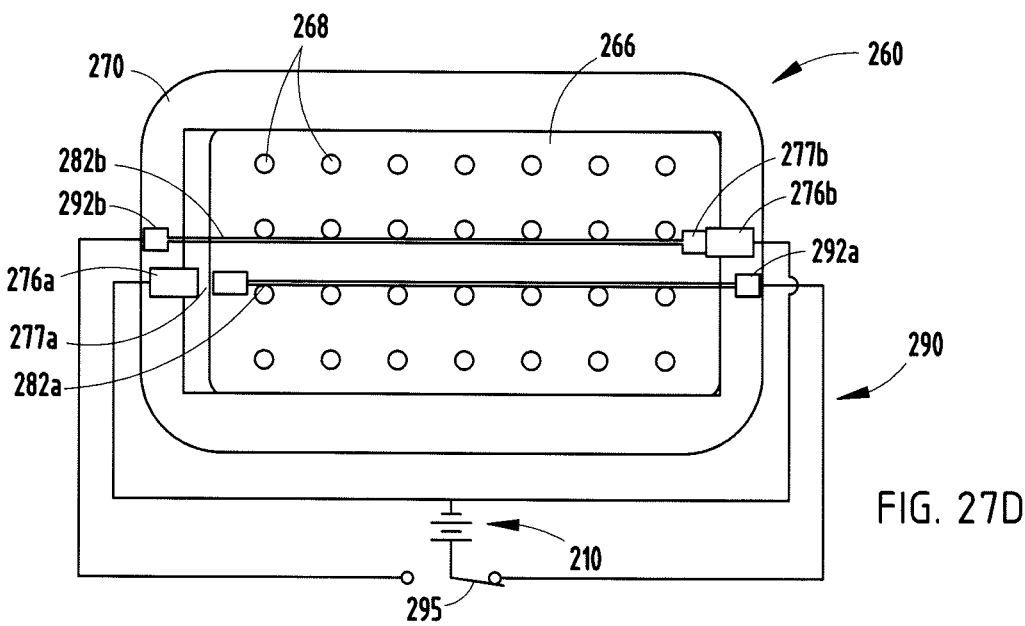
FIG. 27D is a top view of an embodiment of the valve shown in FIG. 27A, but with both actuators in a shortened condition.

When the switch 295 is moved to the on position, current flows through actuator 282b, causing it to heat, shorten and pull plate 266 to the left toward the open position. When plate 266 reaches the open position, as shown in FIG. 27B, the electrical connection between contacts 276b and 277b is broken. When the circuit is broken, current ceases to flow through actuator 282b. This accomplishes two things. First, no additional energy is drawn from the battery 210 while the device remains turned on, and second, actuator 282b cools and returns to an elongated condition, as shown in FIG. 27C, so the plate 266 can be moved back to the left when the device is turned off. When the switch 295 is moved to the off position, the circuit that includes actuator 282a is closed, and the flow of current therethrough causes it to shorten and pull the plate 266 to right, toward the closed position. When the plate 266 reaches the closed position, the electrical connection between contacts 276a and 276b is broken, as shown in FIG. 27D, and current ceases to flow through actuator 282a, allowing the actuator to cool and elongate, as shown in FIG. 27A.

Electrical connections to contacts 276a, 276b, 277a and 277b can be made in any suitable manner. For example, connections can be made through the chassis 270 or through an interface between the top surface of the chassis 270 and the corresponding surface of an adjacent component, such as a lid covering the chassis 270 and valve 260, to the edges of the fluid regulating system. In another example, electrical connections can be made through suitably placed contacts extending through a lid covering the valve 260. A switch that is part of the cell can be affixed to a suitable surface of the cell and/or fluid regulating system, such as on an exterior surface of a lid. Alternatively, a switch can be located on an outer surface of a multiple cell battery, or within a device in which the battery is installed, with electrical connections to the fluid regulating system made in a suitable manner, such as by welding, soldering or pressure between corresponding contacts. In other embodiments, more than two actuators can be used.

Figure 26:
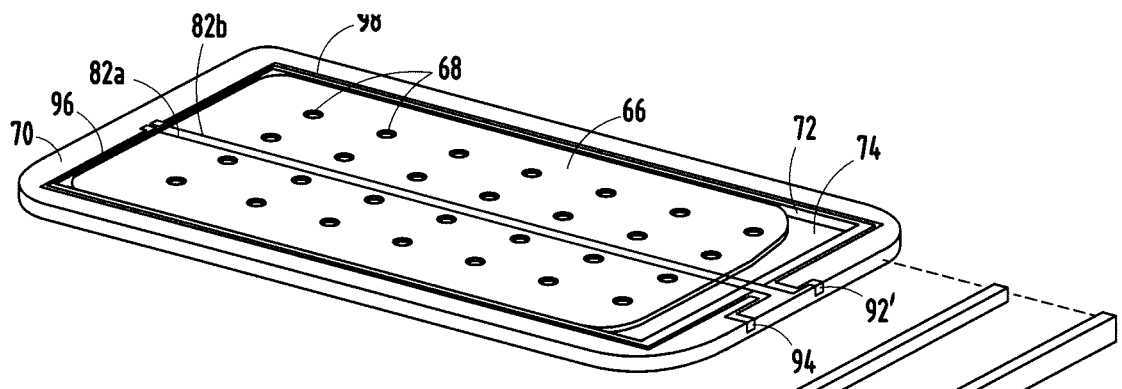
FIG. 26 is an exploded partial perspective view of a portion of a fluid regulating system in accordance with an embodiment of the invention.

Instead of incorporating the control circuit electronics within the fluid regulating system, they can be located externally. This may be desirable in situations where they cannot be conveniently fit internally, for example. In one embodiment the electronics can be mounted on an exterior side of the fluid regulating system, such as within a cap mounted on the side wall of the fluid regulating system and/or the cell, as shown in FIG. 26. FIG. 26 shows a chassis 70, moveable plate 66, SMA wires 82a and 82b, and contact terminals 92' and 94 similar to those in FIG. 4. Unlike FIG. 4, however, the SMA wires 82a and 82b in FIG. 26 are connected directly to the contact terminals 92' and 94, with no intermediate control circuit 90. The control circuit in FIG. 26 is contained in a circuit board 91 secured to the side of the chassis 70 with a cap 93 that protects the circuit board 91. The contact terminals 92' and 94 on the chassis 70 make electrical contact with corresponding terminals on the surface of the circuit board 91. Electrical contact can be made in any suitable manner, such as by pressure contact. The circuit board 91 can have a single substrate layer, or it can be a laminated substrate with two or more layers. The electronics components and electrical connections can include printed or non-printed components, or combinations thereof. Larger components can be disposed in recesses in the surfaces of the circuit board 91 to provide flush fits with the chassis 70 and cap 93. The electrical connections between the circuit board 91 and the cell are not shown, but these connections could also be made through the chassis 70.

Figure 29:
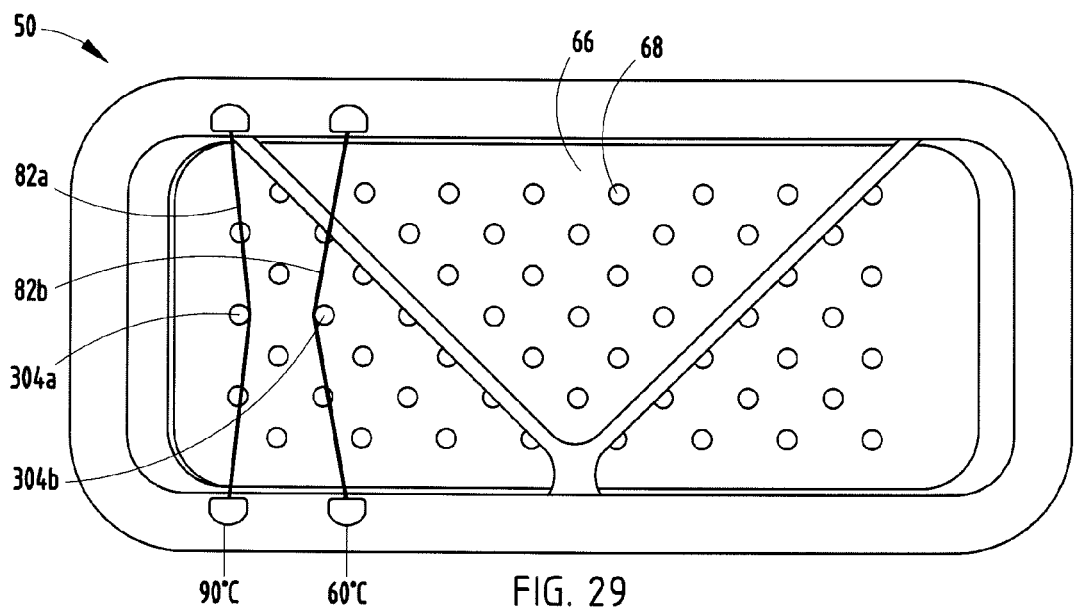
FIG. 29 is a top view of a fluid regulating system employing a passive closure actuator, according to one embodiment.
Figure 30:
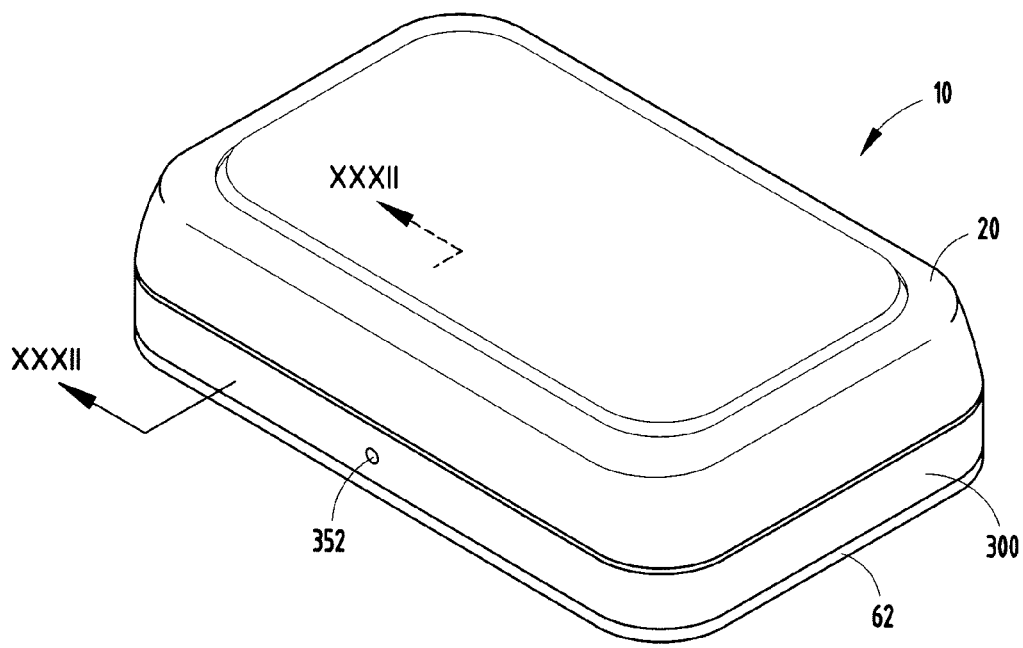
FIG. 30 is a perspective view of a battery having a fluid regulating system with a pressure equalization fluid passage provided in the chassis, according to another embodiment.
Figure 31:
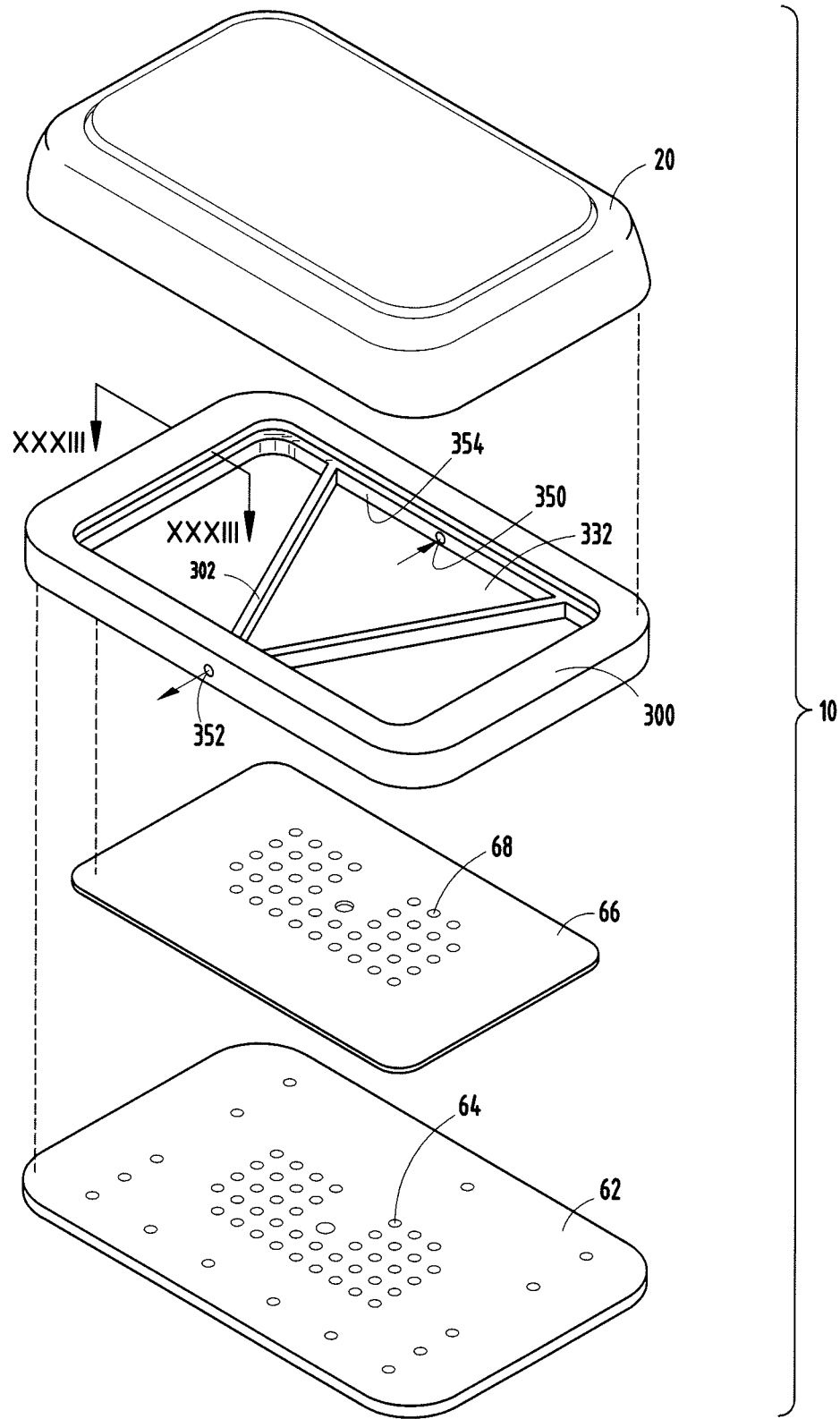
FIG. 31 is an exploded perspective view of the battery having a fluid regulating system with a fluid passage shown in FIG. 30.
Figure 32:
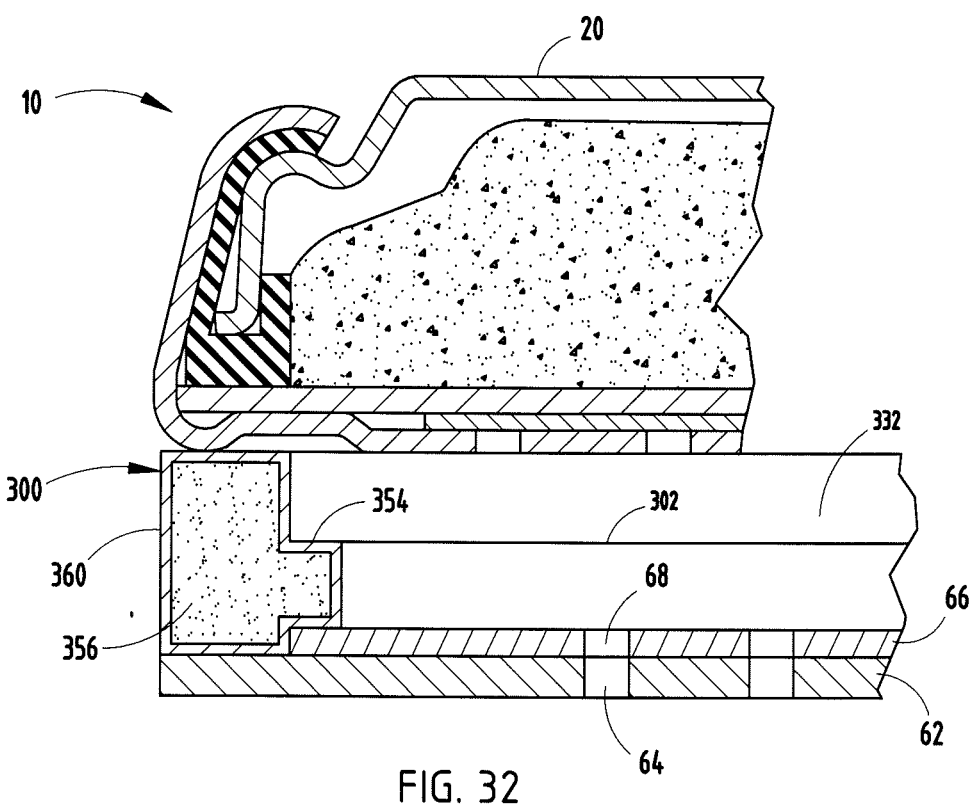
FIG. 32 is a cross-sectional view of a portion of the battery and fluid regulating system taken through lines XXXII-XXXII of FIG. 30.

Referring to FIG. 29, a fluid regulating system 50 is illustrated for regulating fluid (e.g., air) to a battery by controlling the opening and closing of the valve and further includes a passive temperature closure, according to a further embodiment. SMA wire 82a may be electrically energized to heat up and contract and thereby move moving plate 66 to the open valve position (as shown in FIG. 29) via actuator pin 304a. SMA wire 82b may be electrically energized to heat up and contract and thereby move moving plate 66 to the closed valve position via actuator pin 304b. The valve may therefore be actively opened and closed in response to electric current applied to either SMA wires 82a or 82b. Additionally, the SMA wires 82a and 82b are selected with different actuation temperatures to provide a passive temperature closure of the valve, according to one embodiment of the present embodiment. The SMA wires 82a and 82b have an unbalanced actuation temperature to achieve the desired passive closure of the valve. Thus, the moving plate 66 is moved to the closed valve position upon experiencing a predetermined temperature limit.

In the embodiment shown and described in FIG. 29, the SMA wire 82a is configured with a first actuation temperature of about 90° C., whereas the SMA wire 82b is configured with a lower second temperature of about 60° C. When electrically energized, SMA wire 82a heats up and contracts to apply force to actuate moving plate 66 to the open position upon reaching the higher first temperature. Similarly, SMA wire 82b may be electrically energized to heat up and contract to actuate the valve to move moving plate 66 to the closed position at the lower second temperature. The first temperature is greater than the second temperature such that the SMA wire 82b closes the valve when the temperature of SMA wire 82b reaches the lower second temperature. It should therefore be appreciated and in addition to actively opening and closing the valve based on electrical current applied to the SMA wires 82a and 82b, the SMA wire 82b forces the moving plate 66 to the closed valve position when the ambient temperature first reaches the lower second temperature. If the temperature of the environment continues to rise to the higher second temperature, the SMA wire 82a will not apply sufficient force to change the position of the valve from its closed position.

SMA wires 82a and 82b may include commercially available SMA components. One example of a 60° C. actuation SMA wire is a 0.102 mm (0.004 inch) diameter 60° C. wire, commercially available from Flexinol. One example of a 90° C. actuation SMA wire is a 0.076 mm (0.003 inch) diameter 90° C. wire, commercially available from Flexinol. In the example given, the 60° C. SMA wire will remain contracted until the temperature has dropped back down to about 40° C., thereby resulting in a temperature hysteresis.

The fluid regulating system 50 employing the unbalanced temperature SMA wires advantageously provides a passive method for closing the valve to prevent fluid ingress to the battery cell above a predetermined temperature. By closing the fluid regulating system 50 at a predetermined temperature, such as 60° C., degradation of the battery may be minimized or prevented. Additionally, by moving the valve closed upon reaching a temperature limit, such as 60° C., opening of the valve at high temperatures is prevented. It should be appreciated that the predetermined temperature for closing the valve may be greater than 45° C., and more particularly, may be set at about 60° C.

According to one embodiment, the SMA wires 82a and 82b may be configured having different sizes to generate different actuation forces such that the SMA wire 82b generates a greater actuation force than the actuation force generated by SMA wire 82a. In an exemplary embodiment, SMA wire 82b has a greater cross-sectional area, such as a greater diameter, than SMA wire 82a. With a larger cross-sectional area, SMA wire 82b applies a greater closing force to the moving plate of the valve in the event that the ambient temperature reaches the higher first temperature. It should be appreciated that the SMA wires 82a and 82b may be circular in cross-section and the second SMA wire has the larger diameter. According to other embodiments, the SMA wires 82a and 82b may have other cross-sectional shapes, such as oval, square or rectangular shapes, with the second SMA wire 82b having a greater dimension, resulting in a greater cross-sectional area, which results in a greater actuation force than the first SMA wire 82a. In another embodiment, SMA wires 82a and 82b may have both different cross-sectional areas and different phase transition temperatures, such that SMA wire 82b will generally be actuated first as the ambient temperature increases, which results in the valve remaining closed even as the ambient temperature rises above the higher phase transition temperature of SMA wire 82a.

Referring to FIGS. 30-34, a fluid consuming battery 10 is shown having a battery cell 20 and a fluid regulating system 50 having a fluid passage through the chassis body 300 that provides for pressure equalization between the cell 20 and the outside environment, according to two embodiments. In the embodiments shown, a chassis is generally illustrated by the overmold body 300 having a central opening 332 and an inward extending ledge 354. A fluid consuming battery cell 20, such as an air cell, is connected on the top surface of the chassis 300. The fixed plate 62 with fluid entry ports 64 is connected to the bottom surface of chassis 300 and moving plate 66 with ports 68 is disposed between the lower wall of inward extending ledge 354 and fixed plate 62 so that plate 66 may be moved relative to plate 62.

In the embodiment shown in FIGS. 30-33, the overmold chassis body 300 is generally illustrated having a first port, also referred to as an inlet 350, located generally between the cell 20 and the moving plate 66, and in fluid communication with opening 332 and cell 20. The chassis body 300 also has a second port, also referred to as an outlet 352, provided on the outside of the overmolded material leading to the outside environment. The overmolded chassis 300 is manufactured to have a nonporous outside layer 360 and a porous internal volume that provides the fluid passage 356. The nonporous outside layer 360 is generally non-permeable to fluid, particularly air, and may include an epoxy, according to one example. The porous internal volume provides for a pressure equalization fluid flow passage 356 that extends from the inlet 350 to the outlet 352. The porous internal volume may include an air permeable material, such as microporous polytetrafluoroethylene material, or a non-woven porous material that allows restricted air flow at a low diffusion rate through the passage 356. Alternatively, or in addition, the fluid passage 356 may include empty void volume providing a sufficiently restricted passage that allows air flow at a low diffusion rate. The fluid passage 356 advantageously allows air to slowly pass from the inlet 350 to outlet 352, however, the fluid passage 356 may allow fluid to pass in either direction between the inlet 350 and outlet 352 to provide pressure equalization between the cell 20 and the outside ambient environment.

The inlet 350 of fluid passage 356 is in fluid communication with the open volume between the battery cell 20 and valve plates 66 and 62. A pressure differential existing between gases within the battery cell 20 and outside environment may allow gas to migrate through the fluid passage. When the battery cell 20 generates gas, the gas may migrate through the restricted fluid passage 356 to the outside environment to prevent compromising the seal between the valve plates 66 and 62. Contrarily, gas may be permitted to flow from the outlet 352 to the inlet 350, but is generally restricted such that air is not freely supplied to the battery cell 20 so that the cell 20 is generally not discharged at a high rate when the valve is closed.

Figure 33:
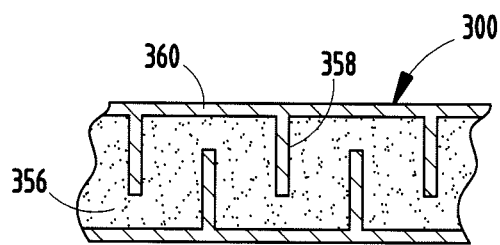
FIG. 33 is a cross-sectional view of the chassis taken through lines XXXIII-XXXIII of FIG. 31 further illustrating baffles forming a tortuous fluid passage.

According to one embodiment, the fluid passage 356 has an air diffusion rate that would result in a loss of no more than ten percent (10%) of the cell capacity per year at room temperature due to moisture gain or loss. It should be appreciated that the porous volume of the fluid passage 356 may include a membrane that is generally porous to gases to provide a tortuous or restricted air flow passage, but does not allow free unrestricted flow of fluid into the cell 20. According to one embodiment, the porous volume 356 may include a tortuous fluid passage 356, such as that provided by baffles 358 as shown in FIG. 33. The baffles 358 essentially increase the effective length of the airflow passage 356 through the overmolded chassis 300, thus increasing the net effective fluid flow path length. According to other embodiments, the tortuous fluid flow path may employ a honeycomb pattern that is generally porous to allow excess gas to escape from the cell 20 to the outside environment, while minimizing the amount of air from entering the cell 20.

Figure 34:
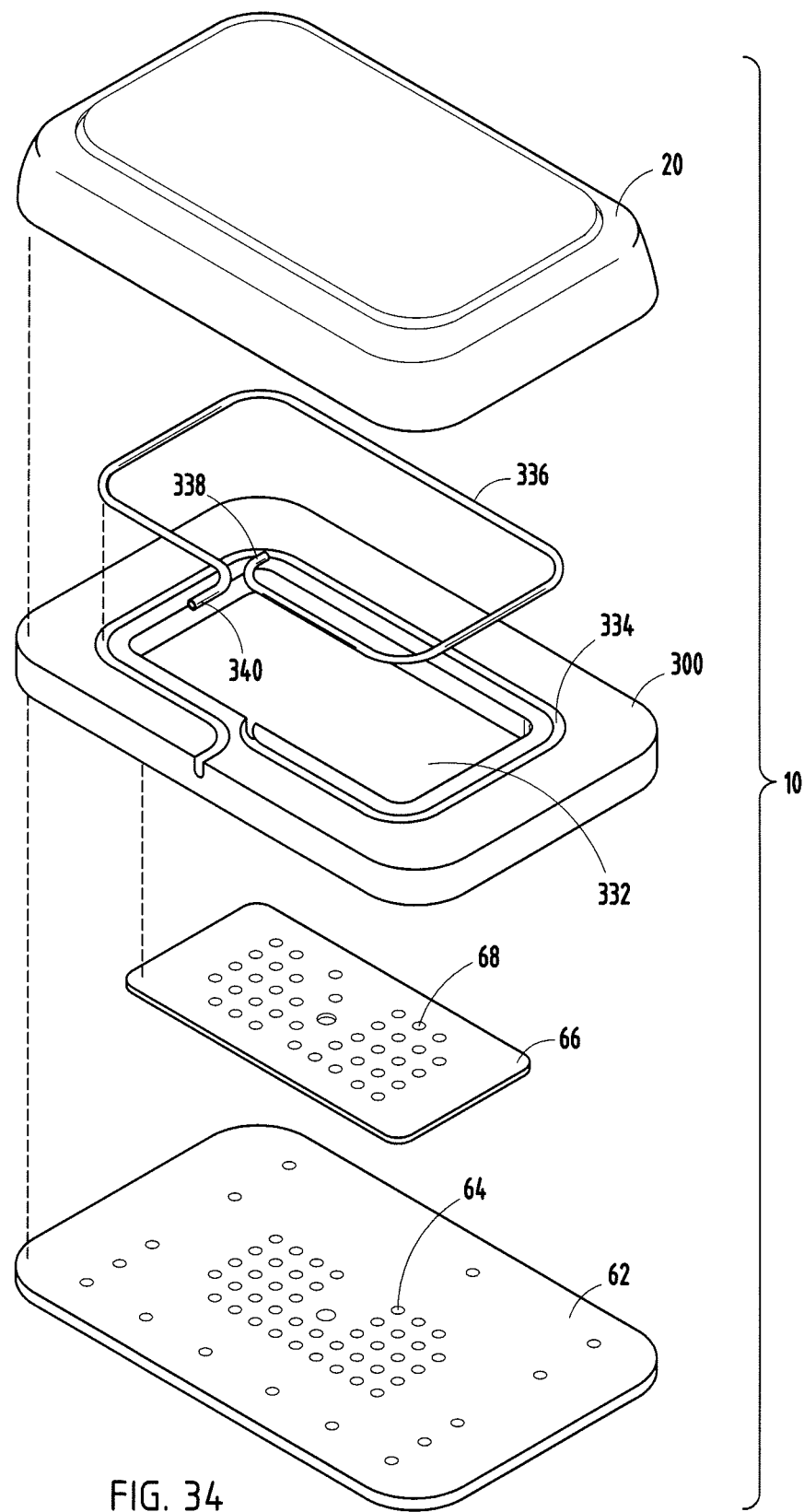
FIG. 34 is an exploded perspective view of a battery having a fluid regulating system with a pressure equalization fluid passage, according to another embodiment.

In the embodiment shown in FIG. 34, the top surface of the overmold chassis body 300 has a slot 334 formed therein in a generally serpentine shape that extends from the inside opening 332 in a rectangular shape about the opening 332 by about 360° leading to the outside surface of the chassis 300. Disposed within the slot 334 is a hollow tube 336 having a general configuration adapted to be sized and fit within slot 334. The tube 336 has a first port, also referred to as an inlet 338, at one end in fluid communication with the inside opening 332 of the chassis 300 and cell 20, and has a second port, also referred to as an outlet 340, at the other end in fluid communication with the outside environment. The fixed plate 62 is shown connected on the bottom surface of chassis 300. The moving plate 66 is disposed below ledge 354 and is adjacent to and in sealed relationship with the fixed plate 62, such that plate 66 is moveable relative to plate 62 to open and close the valve.

The tube 336 provided within chassis 300 provides a fluid passage that extends between the inlet 338 and outlet 340 such that fluid released from the battery cell 20 is able to pass through the fluid passage of tube 336 to the outside environment. The fluid inlet 338 is located in position in the volume of opening 332 between the battery cell 20 and the fixed and moving plates 62 and 66, according to one embodiment. Thus, the extended length and small diameter of tube 336 provides a tortuous fluid passage that allows fluid to escape from the cell 20 at a sufficiently low diffusion rate, while sufficiently restricting air ingress to the cell 20 due to the low diffusion rate. In one embodiment, tube 336 has a sufficiently restricted inner diameter of less than 0.5 mm and an effective length of at least 200 mm. According to another embodiment, the slot 334 may be covered and utilized as the fluid passage in lieu of use of the tube 336.

In the disclosed embodiments of FIGS. 30-34, a pressure differential existing between the gases within the battery cell 20 and the ambient outside environment in which the cell 20 is exposed may cause a disruption, which may lead to subsequent failure of the fluid barrier. Thus, the intended primary seal barrier between the valve plates 62 and 66 can be compromised, which would potentially allow uncontrolled ingress and egress of fluid, such as water, oxygen, hydrogen, and carbon dioxide, which could result in the unacceptable loss of battery shelf-life. The pressure equalization fluid passage 336 or 356 provided in chassis 300 allows fluid such as gases to migrate through the fluid passage to egress and ingress. By providing an appropriately sized hole of a suitable length, the fluid passage allows for the egress of gas, such as hydrogen generated within a metal-air cell, while prohibiting excess ingress of oxygen and carbon dioxide to the cell 20.

Referring to FIGS. 35-49, a fluid consuming battery 10 is generally illustrated having a fluid consuming battery cell 20 and a fluid regulating system 50 that includes a chassis 550 with an electrically conductive frame 500 and components integrally formed therein, according to one embodiment of the present invention. The assembled battery 10 having the fluid consuming cell 20 and fluid regulating system 50 is generally illustrated partially exploded in FIG. 35, and the assembly steps are generally shown in FIGS. 36-49. According to this embodiment, the fluid regulating system 50 includes an electrically conductive frame 500 having a plurality of electrical components 540, 542, 544 and 546 assembled thereon. The electrically conductive frame 500 and the electrical components 540-546 assembled thereon are substantially encapsulated within an electrically non-conductive chassis 550. The chassis 550 is made of an electrically non-conductive material that essentially covers the electrically conductive frame 500 and electrical components as described herein.

The chassis 550 may include an epoxy or other electrically non-conductive material that can be formed in the desired configuration to substantially encapsulate the electrically conductive frame 500 and the electrical components 540-546 assembled thereon. The chassis 550 is formed having a shape that supports at least some of the components of the valve and connects to the battery cell 20. The frame 500 and electrical components 540-546 can be substantially encapsulated by the chassis 550 using any suitable method, such as molding (e.g., insert molding) or coating (e.g., by spraying, dipping, etc.). As used herein, substantially encapsulated means that the majority of the combined surface area of the frame 500 and electrical components 540-546 is covered by the chassis 550, but portions of the frame 500 and/or electrical components 540-546, such as electrical contacts and contact pads, can be exposed or extend from the chassis 550. The materials used for the frame 500 and chassis 550 can be selected such that the coefficient of thermal expansion (CTE) of the frame 500 is substantially similar to the CTE of the chassis. By matching the CTEs, the resulting frame and chassis structure is less susceptible to the creation of leakage paths due to variations in expansion when the temperature varies.

Figure 35:
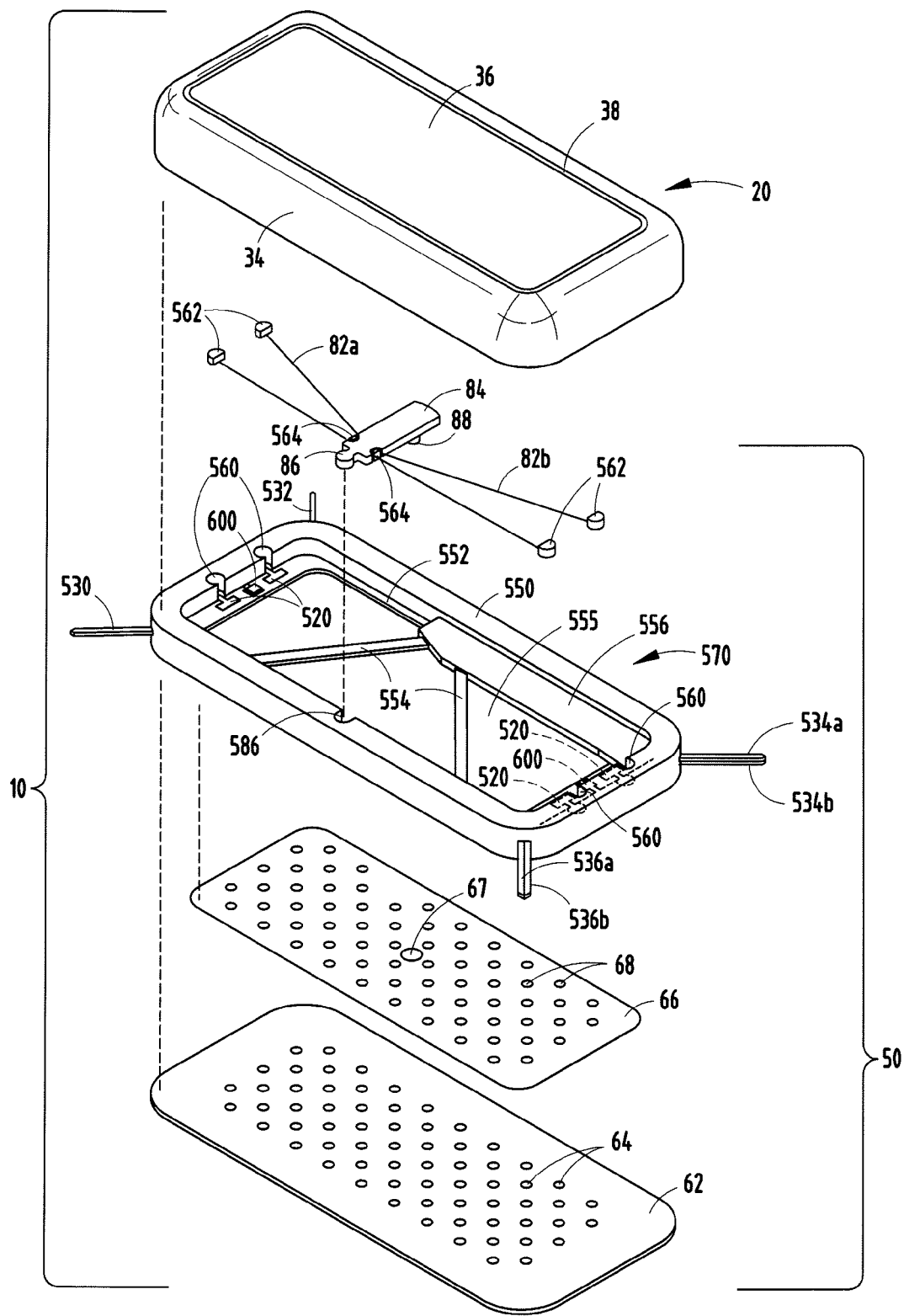
FIG. 35 is an exploded perspective view of a battery having a fluid regulating system employing a chassis and an electrically conductive frame encapsulated in the chassis, according to one embodiment.

As seen in FIG. 35, the valve is shown including a moving plate 66 having a plurality of apertures 68 and a fixed plate 62 having a plurality of apertures 64. The chassis 550 generally defines a central opening 555 and includes an inward extending ledge 552. The periphery of the moving plate 66 is positioned on and abuts the bottom surface of the inward extending ledge 552. Additionally, the chassis 550 has ribs 554 which extend across the opening 555 above the moving plate 66. The ribs 554 are shown generally formed in V-shape extending diagonally through opening 555 and serve to hold the central portion of the moving plate 66 flat above the underlying fixed plate 62. In the embodiment shown, the fixed plate 62 is connected to the bottom side of the chassis 550, and the fluid consuming battery cell 20 is connected to the top side of the chassis 550. In this arrangement, fluid (e.g., oxygen and other gases) from the outside environment may enter the fluid entry ports of the cell 20 by way of the valve when the valve is open.

The chassis 550 is further illustrated having crimp connector openings 560 formed in desired locations and adapted to receive crimps 562 of the SMA wire actuators 82*a* and 82*b*. The crimp connector openings 560 may be integrally formed during formation of the chassis 550 or may be subsequently formed by removing material (e.g., machining or etching) to form the desired opening shape and size. Extending from each of the crimp connector openings 560 are respective circuit elements of the frame 500 that serve as contact pads 520. Contact pads 520 are formed as part of the electrically conductive circuit elements of the frame 500 and are adapted to make electrical contact with the SMA wire actuators 82*a* and 82*b* to apply electrical current thereto. The frame 500 further includes a plurality of circuit elements that serve as battery contacts 530, 532, 534*a*, 534*b*, 536*a* and 536*b* extending from the chassis 550, each of which is adapted to be bent into contact with a terminal of the fluid consuming cell 20. The contacts 530, 532, 534*a*, 534*b*, 536*a* and 536*b* can extend from the corners, as shown, or from other portions of the chassis 550.

The chassis 550 is further illustrated in FIGS. 35-41 having a pair of position sensors 600 located on the chassis 550, according to one embodiment. The position sensors 600 are located on opposite ends of the chassis 550 for sensing position of the moving plate 66 of the valve. In the embodiment shown, one of the position sensors 600 senses position of the moving plate 66 relative to one end of the chassis 550 defining the open valve position, while the other position sensor 600 senses position of the moving plate 66 relative to the opposite end of the chassis 550 defining the closed valve position. Thus, the position sensors 600 may be used to sense when the moving valve plate 66 is in the open and closed positions. One of the position sensors 600 is shown located in a position where the moving plate 66 is expected to make contact with the position sensor 600 when the moving plate 66 is in the open position. The other position sensor 600 is shown located in a position on the opposite end of chassis 550 where the moving plate 66 is expected to make contact with the position sensor 600 when the moving plate 66 is in the closed position. By sensing that the valve is in the open position or closed position, the control circuitry may further enhance the control of the valve of the fluid regulating system to achieve optimal fluid supplied to the fluid consuming electrode.

It should be appreciated that one or more position sensors 600 may be employed to sense whether the valve is in at least one of the open and closed positions. Additionally, one or more position sensors 600 may sense intermediate positions of the moving plate 66 of the valve between the open and closed positions. The position sensors 600 may include linear transducers, according to one embodiment. According to another embodiment, the position sensors 600 may include proximity sensors. Other embodiments of the position sensors 600 may include a laser sensor, an optical sensor, a microswitch position sensor, as well as other sensing devices that may indicate if the valve plate is in the open position or closed position. Alternately, an indirect sensing method may include monitoring the battery cell voltage and determining the valve position based on the battery cell voltage, according to another embodiment.

The position sensors 600 may be used to verify that the valve is actuated properly. According to another embodiment, a redundant set of trigger points could be set in place of a valve position sensor. If the valve fails to open properly, for example, the battery cell voltage may continue to drop below a first upper open voltage set point. Upon reaching a second lower open voltage set point, the valve may be sent a second actuated pulse via the actuator assuming that the valve failed to open the first time. If the position sensor indicates that the valve is not in the proper location, a second actuation signal can be given to open or close the valve. If the second actuation signal does not move the valve, the assumption could be made that there is a more serious problem with the valve. Other more drastic measures could be employed such as sending a series of open and close signals to try to get the valve to move. Assuming that the valve is stuck, the open and close signals could rock the valve back and forth to free it from the obstruction. Alternatively, this information could be communicated back to the device and user if a communication capability exists.

The fluid regulating system 50 includes the valve actuator shown in the present exemplary embodiment made up of first and second SMA wires 82*a* and 82*b*. According to the embodiment shown, SMA wires 82*a* and 82*b* are connected to lever 84 by way of arcuate slots 564. Specifically, the first SMA wire 82a extends between end crimps 562 and one slot 564 and may be activated to pull the lever 84 in one direction to open the valve, while the second SMA wire 82b is connected between end crimps 562 and the other slot 564 to pull lever 84 in the opposite direction to close the valve. Lever 84 includes an actuator pin 88 which engages moving plate 66 to move the plate 66 between the open and closed valve positions as discussed herein. While the valve actuator is shown and described herein employing two SMA wires 82a and 82b connected via respective arcuate slots 564 to a lever 84, it should be appreciated that other types and arrangements of valve actuators may be employed to actuate the moving plate 66 relative to the fixed plate 62 to open and close the valve. Further, it should be appreciated that while a generally linear actuation of moving plate 66 is shown and described herein, other configurations of valves may be employed to control the flow of fluid to the fluid consuming cell 20.

Figure 36:
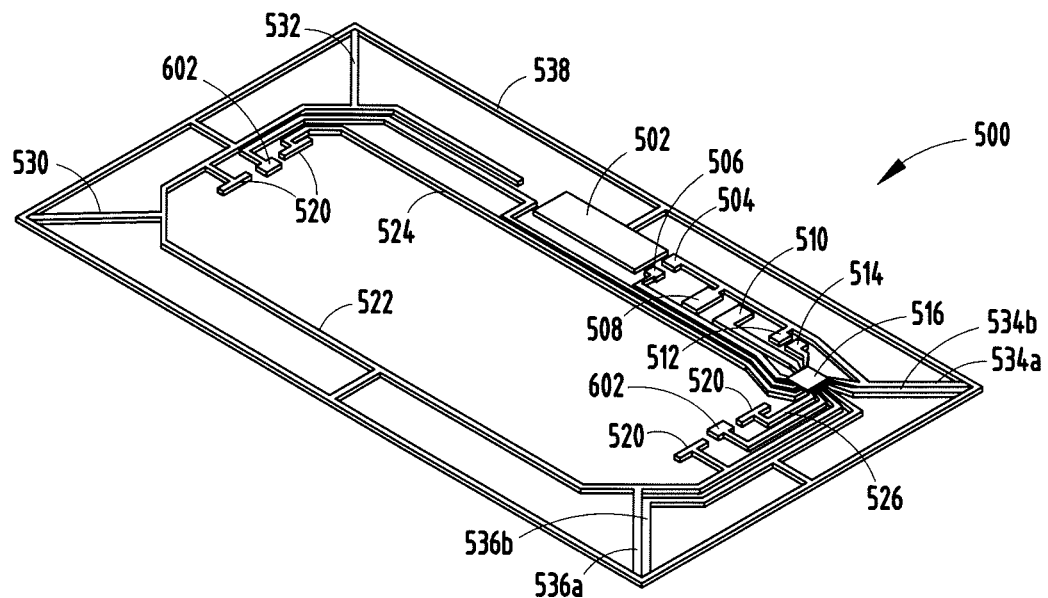
FIG. 36 is a perspective view of an electrically conductive frame employed in the fluid regulating system of FIG. 35.

The assembly of the fluid regulating system 50 and battery 10 is illustrated in FIGS. 36-49. Referring to FIG. 36, the electrically conductive frame 500 is generally illustrated therein, according to one embodiment. The electrically conductive frame 500 is generally made of an electrically conductive material that provides electrical conductivity and structural integrity for handling. The frame 500 may be implemented as a lead frame, according to one embodiment. The frame 500 includes electrically conductive circuit elements that are configured to conduct electrical current amongst various electrical components.

The frame 500 may include a nickel-iron alloy, according to one embodiment. Examples of nickel-iron alloys include INVAR®, Super INVAR®, KOVAR®, and INVAR® alloys 36, 42, 46, 48 and 52. "True" INVAR® has the formula $Fe_{65}Ni_{35}$. For the INVAR® alloys, the alloy number corresponds approximately to the weight percent of nickel. According to a more specific example, the electrically conductive frame 500 may include a nickel-cobalt ferrous alloy sold under the trade name KOVAR®, which is generally composed of approximately 29 percent nickel, 17 percent cobalt, 0.2 percent silicon, 0.3 percent manganese and 53.5 percent iron, by weight.

According to another embodiment, the frame 500 may be at least partially composed of copper, and, more specifically, may be copper-INVAR®-copper. Copper-INVAR®-copper is a layered material with a layer of INVAR® sandwiched between layers of copper and has been used in printed circuit board technology. It should be appreciated that other electrically conductive materials may be employed in the frame 500 to achieve a frame structure that is electrically conductive and sufficiently rigid for handling, and may be reshaped to form desired contact connections.

The frame 500 is shown having various circuit elements 522, 524, 526 and contact pads 520 for supplying electrical current to electrical components and the SMA wires 82a and 82b of the valve actuator. Additionally, the frame 500 includes circuit elements that serve as battery contacts 530, 532, 534a, 534b, 536a and 536b which enable electrical contact to be made with the positive or negative terminals of the battery cell 20. The frame 500 also includes contact pads 502, 504, 506, 508, 510, 512, 514 and 516 which are generally configured to receive electrical components and/or form electrical connections with such components. The frame 500 further includes frame elements 538 which ultimately form part of a lead frame but are not needed for the final frame configuration and are removed during the assembly process as described below. The frame 500 further includes a pair of sensor contact pads 602 located at opposite ends of the chassis 500 for providing mounting pads for the position sensors 600.

The mounting pads 602 are connected to electrical circuitry that provides control signals to control circuitry.

Figure 37:
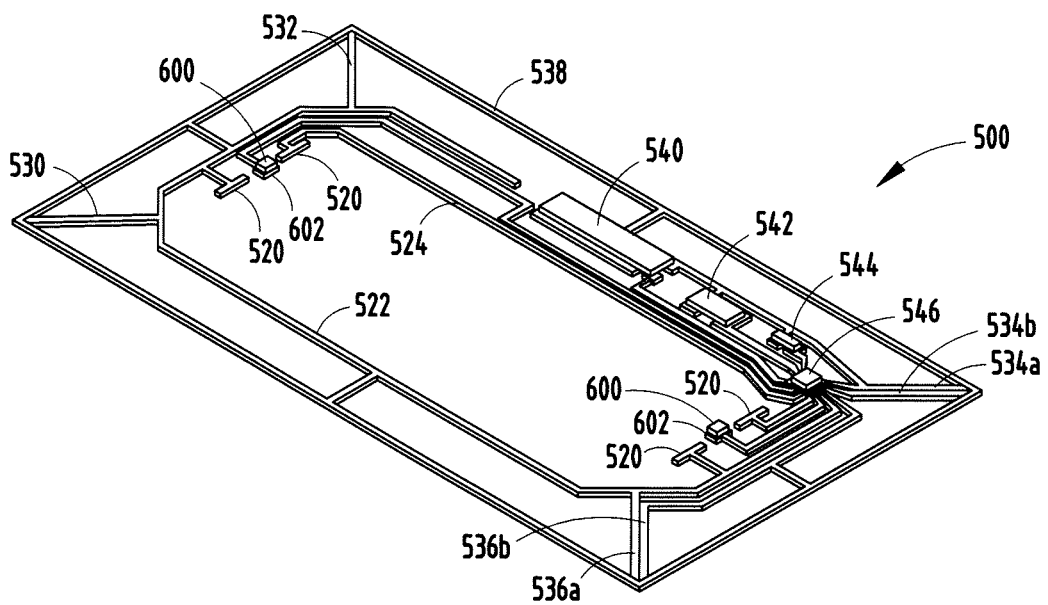
FIG. 37 is a perspective view of the electrically conductive frame having electrical components including position sensors assembled thereon.

The electrically conductive frame 500 may be formed having a substantially uniform thickness. According to one example, the frame has a minimum thickness of about 100 micron. It should be appreciated that the thickness and width of the elements of the frame 500 may determine the structural integrity of the frame 500 and should be selected to allow for reshaping of contact connections as explained herein. The frame 500 may be formed by employing a photoetch technique, according to one embodiment. Alternately, frame 500 may be formed via other frame fabrication techniques employing one or more of stamping, molding, printing or otherwise fabricating the electrically conductive frame 500. The frame 500 may be easily handled during the assembly process. Following formation of the electrically conductive frame 500, one or more electrical components are assembled to the frame 500. As seen in FIG. 37, electrical components 540, 542, 544 and 546 are shown mounted on top of certain contact pads and electrically connected to the frame 500 to form a desired circuit configuration. In the embodiment shown, electrical component 540 may include timing circuitry, such as oscillator crystal, configured to provide a timing signal (e.g., 32 kilohertz). Timing circuitry 540 is shown positioned on top of contact pads 502, 504 and 506. Component 542 may include an inductor positioned on top of contact pads 508 and 510. Component 544 may include a capacitor connected across contact pads 512 and 514. The capacitor, inductor, and optional resistor(s) may be configured to provide a voltage boost circuit. Component 546 may include an Application Specific Integrated Circuit (ASIC) chip disposed on top of pad 516 and providing electrical connection to circuit elements leading thereto. The ASIC 546 may serve as control circuitry for controlling the activation of the actuator to actuate the valve. The timing circuitry 540, inductor 542, capacitor 544 and ASIC chip 546 may be configured to control activation of the valve actuator by supplying electrical current to the appropriate SMA wire actuator 82a or 82b to open and close the valve and thereby control the entry of fluid to the fluid consuming cell 20. The position sensors 600 are mounted on top of the sensor contact pads 602 and sense position of the moving plate 66. While a specific example of electrical components are shown provided on the frame 500, it should be appreciated that other circuit components and circuit arrangements may be employed without departing from the teachings of the present invention.

Figure 38:
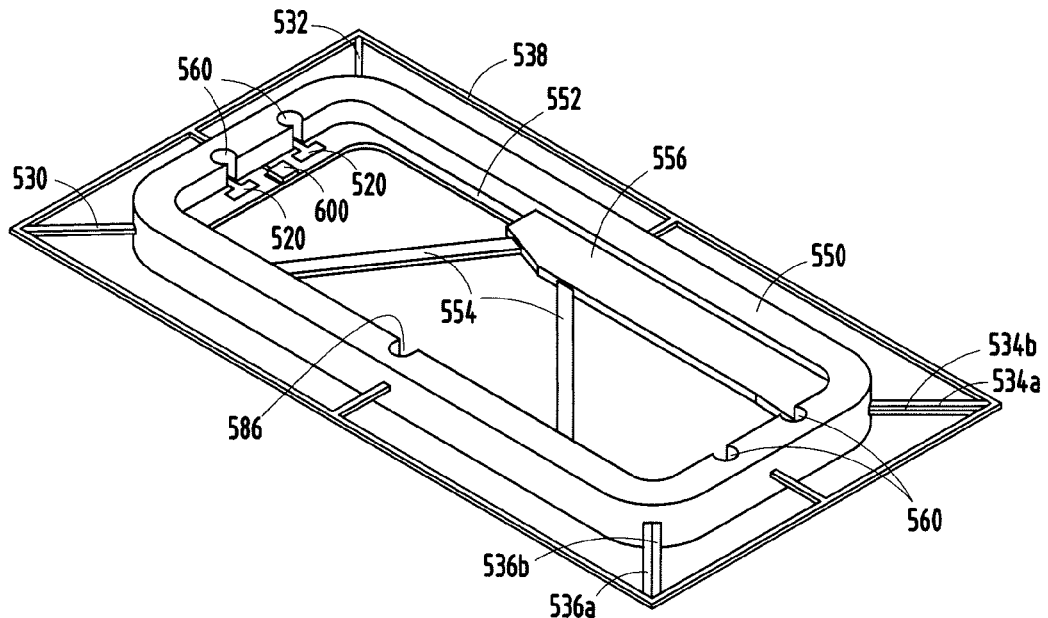
FIG. 38 is a perspective view of the electrically conductive frame substantially encapsulated within a chassis.

Following assembly of the electrical components 540-546 onto the frame 500, the frame 500 is potted in the chassis 550 as shown in FIG. 38. The chassis 550 includes an electrically non-conductive material that substantially encapsulates circuit elements of the frame 500 and the electrical components 540-546 assembled thereto. Chassis 550 may include substrate materials suitable for use in printed circuit boards. According to one embodiment, the chassis 550 may include an epoxy, such as EPICLAM™ L9035 (Epic Resins Electronic Products, Palmyra, Wis., USA) or ADTECH™ EL-323-TC-1 epoxy (Cass Polymers, Oklahoma City, Okla., USA). According to one example, the epoxy forming the chassis 550 has a coefficient of thermal expansion of 5.8 parts per million per degree C. (ppm/° C.), and the KOVAR® forming the frame 500 has a coefficient of thermal expansion of 5 ppm/° C. Thus, the coefficients of thermal expansion of the frame 500 and chassis 550 are substantially matched. The chassis 550 has low fluid (e.g., air) permeability and expands and contracts with the frame 500 due to the substantially matched CTEs. The electrically non-conductive material of the chassis 550 may be molded over the frame 500 by employing conventional molds to achieve a desired configuration. In embodiments in which the chassis 550 does not have a sufficiently low fluid permeability, the chassis 550 can be coated with another material having a lower permeability.

In the embodiment shown in FIG. 38, the chassis 550 is formed having a generally rectangular main body formed around and encapsulating the main circuit elements of frame 500. Additionally, the chassis 550 includes an inward protruding ledge 552 that extends below contact pads 520 of frame 500. The ledge 552 provides an upper surface that abuts the top surface of the periphery of moving plate 66 of the valve. Extending from the ledge 552 are diagonal ribs 554 and a reduced height body 556 which encapsulates additional circuit components assembled on the frame 500. The chassis 550 has a shape and size configured to substantially encapsulate the circuit elements of the frame 500 and the electrical components 540-546 assembled thereto. It should be appreciated that the chassis 550 may be molded to accommodate the inclusion of an air equalization path such as that shown in FIGS. 31-34 and described herein.

The chassis 550 has a plurality of crimp connector openings 560 that may be formed during the molding of the chassis 550 or may be subsequently formed by machining or cutting and removing material to form the crimp connector openings 560 after the molding process. The crimp connector openings 560 are adapted to receive the SMA wire crimps 562 such that the crimps 562 are press fit into the crimp openings 560 and the SMA wires 82a and 82b make electrical contact with contact pads 520. The contact pads 520 and the electrical connection formed by the crimps 562 and/or SMA wires 82a and 82b is described herein according to a few embodiments.

Figure 39:
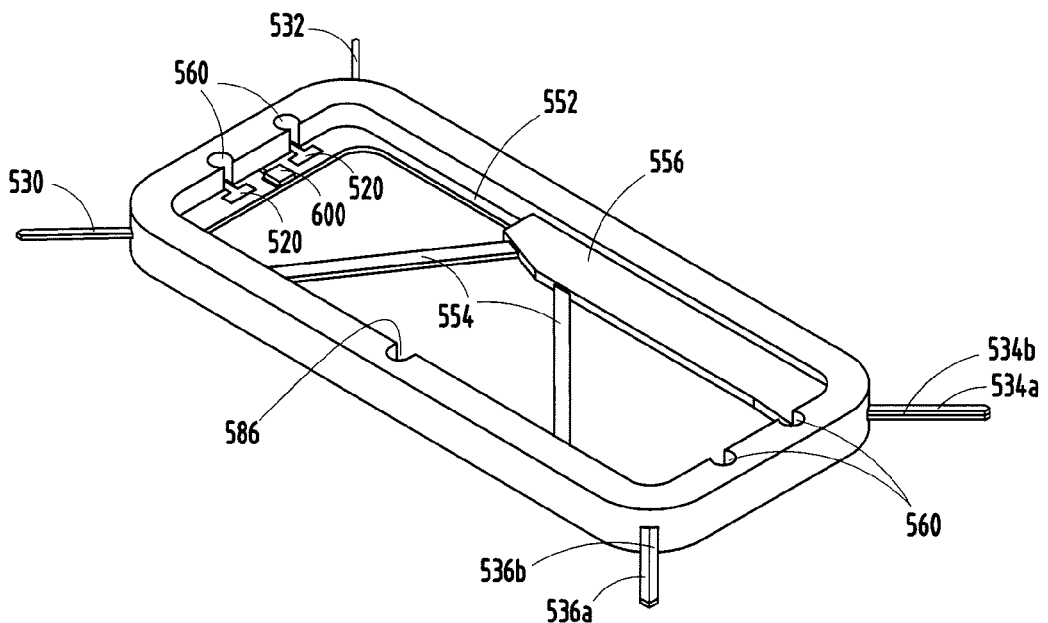
FIG. 39 is a perspective view of the chassis and frame following removal of excess frame elements.

Referring to FIG. 39, remnant elements of the electrically conductive frame 500 that are not needed are removed. This includes removal of frame elements 538. Thus, elements 538 provide structural rigidity and allow for handling of the lead frame 500 prior to and during assembly. Elements 538 are subsequently removed prior to completion of the fluid regulating system 50 and its assembly to the battery cell 20.

Figure 40:
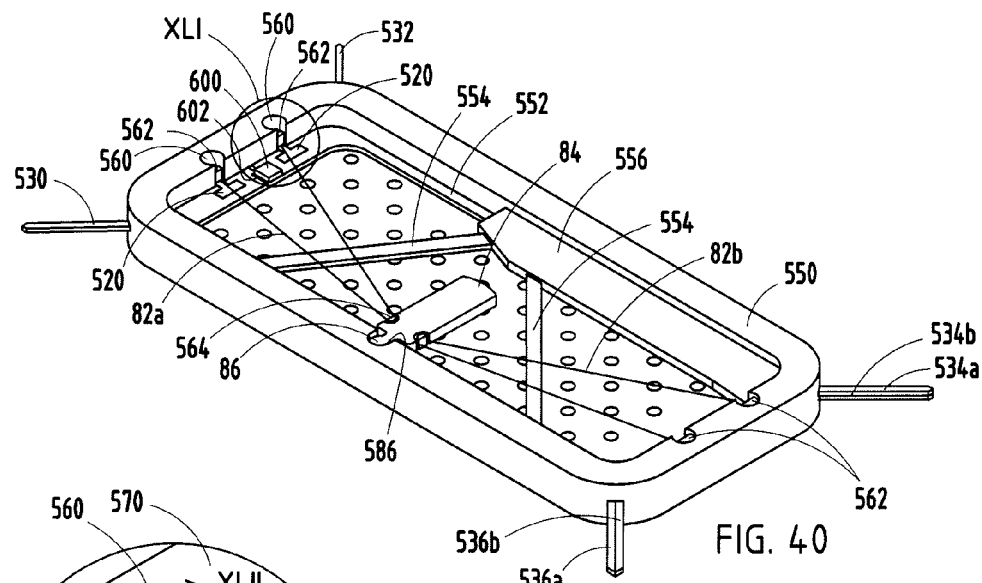
FIG. 40 is a perspective view of the fluid regulating system following assembly of the actuator, according to one embodiment.
Figure 41:
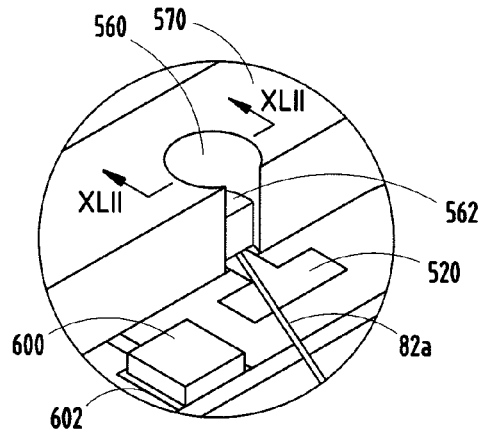
FIG. 41 is an enlarged view of section XLI of FIG. 40, further illustrating the press fit assembly of the actuator crimp in the crimp opening and a position sensor.

Referring to FIG. 40, the valve and actuator are shown assembled to the chassis 550. The moving plate 66 of the valve is inserted below the inward extending ledge 552 and the underlying fixed plate 62 is assembled to the bottom surface of chassis 550. Fixed plate 62 may be adhered, fastened or otherwise connected to chassis 550. The lever 84 is connected to the moving plate 66 and the pivot portion 86 is disposed within an opening 586 in the chassis 550 such that the lever 84 is able to pivot and rotate to move moving plate 66 left and right to open and close the valve.

Figure 42:
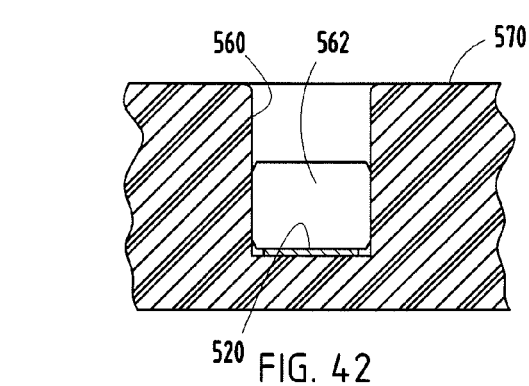
FIG. 42 is a cross-sectional view taken through lines XLII-XLII in FIG. 41, further illustrating the press fit assembly.

SMA wire crimps 562 are press fit within the crimp connector openings 560 in chassis 550. In the first embodiment shown, crimps 562 are press fit and fully inserted to the bottom of respective openings 560 such that the SMA wires 82a and 82b make electrical contact with contact pads 520. As seen in greater detail in FIGS. 41 and 42, the crimp 562 is press fit fully to the bottom of the opening 560 such that sufficient electrical contact exists between the SMA wire 82a and contact pad 520. In this embodiment, crimp 562 is pressed onto the circuit path forming contact pad 522, as seen in FIG. 42, and is held in place due to the interference fit between the walls of the opening 560 and the crimp 562. The crimp 562 has a size and shape (e.g., cylinder) that substantially matches the size and shape of opening 560. The SMA wires 82a and 82b are also shown in electrical contact with respective contact pads 520 such that current supplied via contact pads 520 may pass through one of SMA wires 82a and 82b. It should be appreciated that an adhesive, such as a conductive adhesive may be applied to hold the crimps 562 in place relative to openings 560 and maintain electrical contact between the SMA wires 82a and 82b and the respective contact pads 520. An electrically nonconductive plug (not shown) could further be inserted on top of crimps 562 to isolate the crimps 526 from the overlying battery cell 20.

Figure 43:
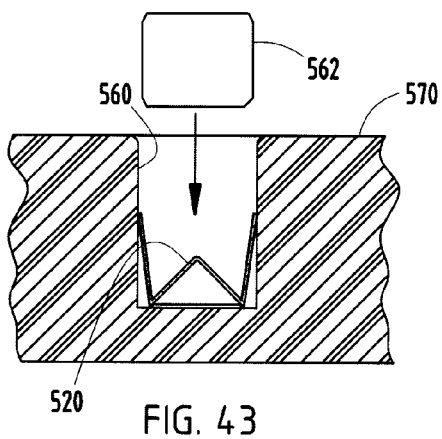
FIG. 43 is a cross-sectional view of a crimp connection prior to assembly according to another embodiment.
Figure 44:
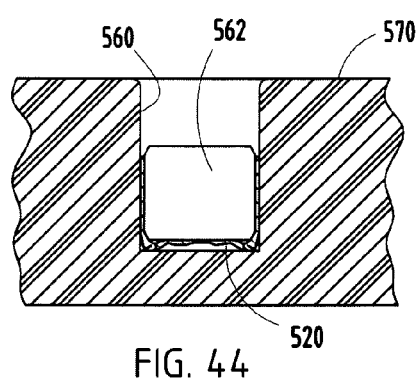
FIG. 44 is a cross-sectional view of the assembled crimp connection shown in FIG. 43.
Figure 48:
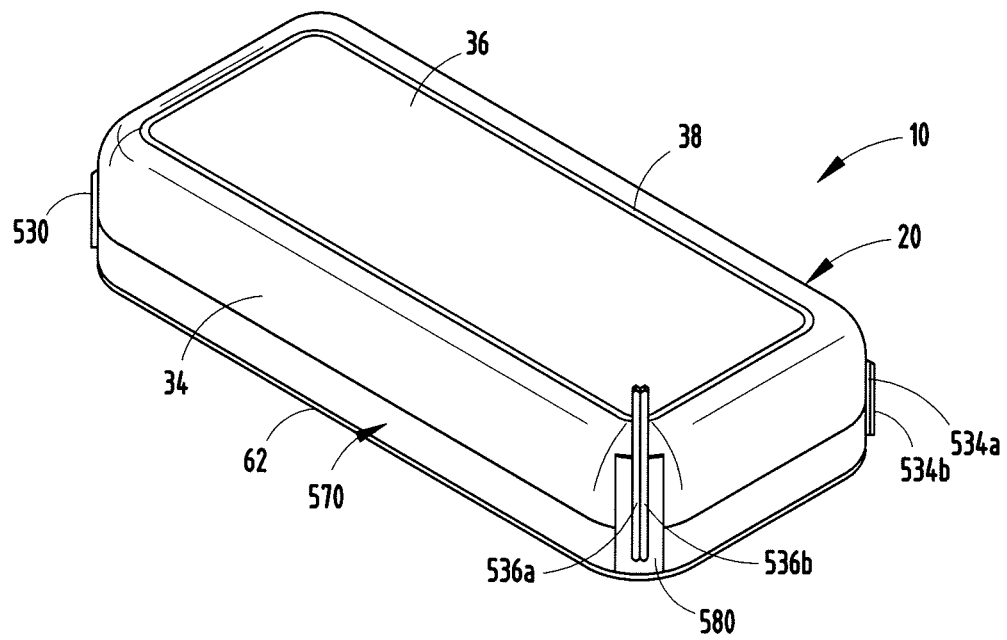
FIG. 48 is a perspective view of the battery illustrating connection of the battery contacts from the frame to the battery terminals.

Referring to FIGS. 43 and 44, an alternate electrical connection between crimp 562 and contact pad 520 is shown therein. In this embodiment, the contact pad 520 is folded inward within crimp connector opening 560 into a generally W-shape as seen in FIG. 43. The bent W-shape of contact pad 520 is generally resilient such it provides a spring-like characteristic. The crimp 562 is press fit within the walls of opening 560 and forced downward so as to engage and compress against the resilient contact pad 520. It should be appreciated that by folding the contact pad 520, the contact pad has a resilience that provides a spring-like bias to maintain adequate electrical contact between the contact pad 520 and the crimp 562 and/or SMA wire connected thereto. As seen in FIG. 44, the crimp 562 is fully inserted into the crimp opening 580 and remains in biased contact with contact pad 520.

Referring to FIGS. 45 and 46, the contact pad 520 is shown folded inward within crimp connector opening 560 in another configuration according to a further embodiment. In this configuration, contact pad 520 provides one or more electrically conductive elements that are resilient and extend upward from the bottom of the crimp connector opening 560. The crimp 562 is press fit within the crimp connector opening 560 so as to compress against the contact pad 520 as seen in FIG. 46. It should be appreciated that other size and shaped contacts may be employed to contact the crimp 562 and/or the SMA wires 82a and 82b.

Following assembly of the actuator and valve to the chassis 550 and frame 500, the fluid consuming cell 20 is assembled to the top surface of the chassis 550 as seen in FIG. 47. It should be appreciated that the fluid consuming cell 20 may be adhered, fastened or otherwise connected to the chassis 520.

Figure 49:
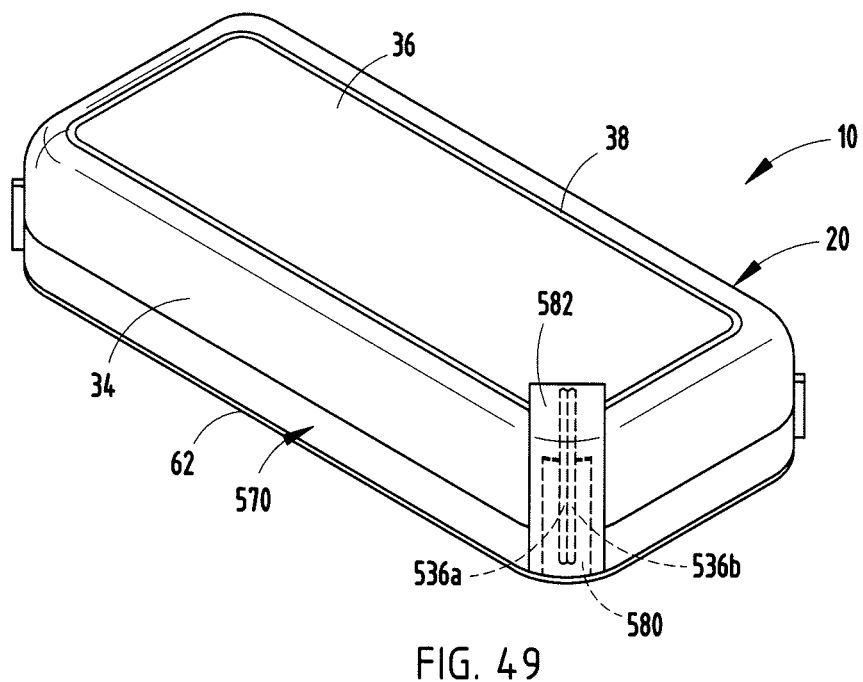
FIG. 49 is a perspective view of the completely assembled battery.

With the fluid consuming cell 20 attached to the chassis 550, the battery contacts are bent upwards and into contact with appropriate terminals of the fluid consuming cell 20. In the embodiment shown in FIG. 48, battery contacts 530, 534a and 534b are bent upwards and into contact with the side wall of the can 34 which forms the positive terminal. It should further be appreciated that the battery contact 532 (not seen) likewise makes contact with the side wall of the can 34 forming the positive terminal. The remaining battery contacts 536a and 536b are bent upwards and into contact with the cover 36 forming the negative terminal of the fluid consuming cell 20. The bending of the battery contacts may be achieved by placing the battery 10 in a die to reshape the conductive elements. An underlying electrically insulating tape 580 is applied below battery contacts 536a and 536b on the side wall of the can 34 so as to electrically insulate contacts 536a and 536b from the positive battery terminal. The battery contacts 536a and 536b extend further beyond insulating tape 580 onto and in contact with the cover 36 forming the negative battery terminal. An overlying electrically insulating tape 582 is then applied over the battery contacts 536a and 536b as seen in FIG. 49.

Accordingly, the fluid regulating system 50 and resulting battery 10 advantageously employs a chassis 550 having an integrally formed electrically conductive frame 500 formed therein, and electrical components that are substantially encapsulated within the chassis 550. The resulting assembly of the electrically conductive frame 500 in the chassis 550 is easy to assemble and results in a protective structure over the circuit elements and components that is not susceptible to leakage of fluid through the chassis 550.

The chassis 550 may be molded over at least part of the position sensors 600 and connecting circuitry such that the position sensors 600 are considered embedded or at least partially embedded in the chassis, according to one embodiment. It should be appreciated that part of the position sensors 600 and connecting circuitry may be embedded while part of each position sensor may extend from the chassis 550 to a location that may sense the position of the moving plate 66 of the valve so as to determine at least whether the valve is in the open or closed position.

Figure 50:
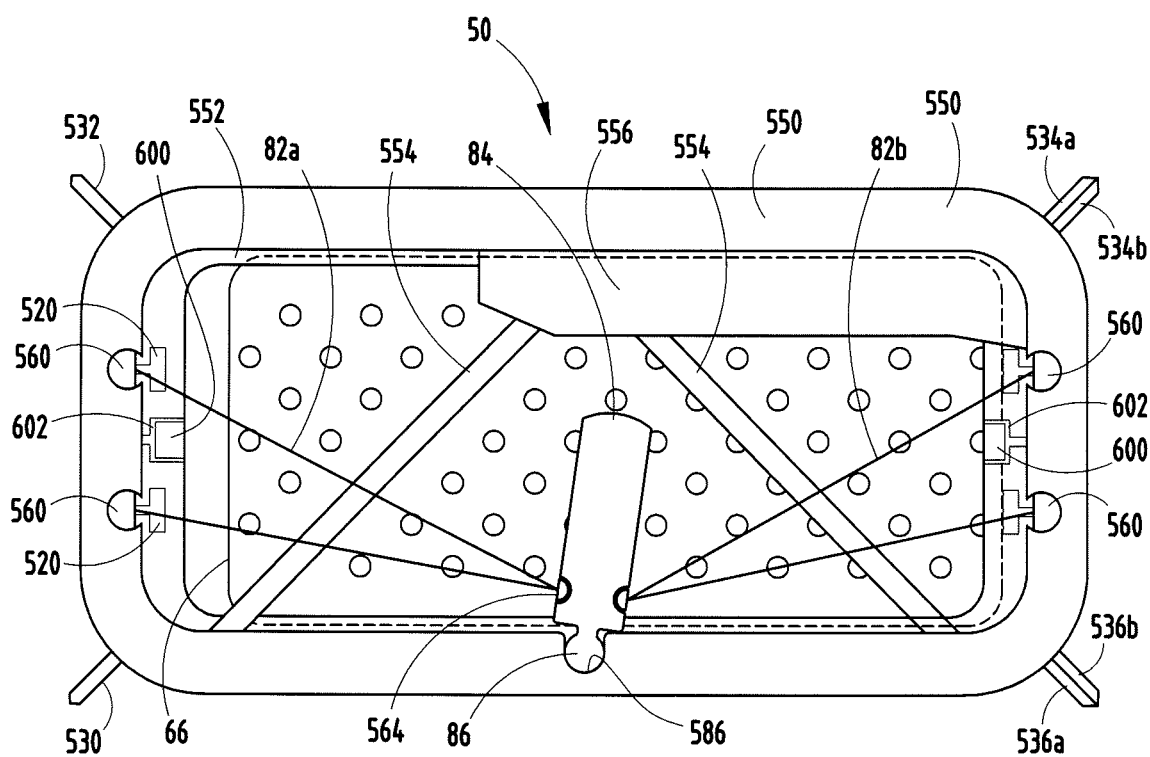
FIG. 50 is a top plan view of a fluid regulating system illustrating two position sensors embedded in the chassis, according to one embodiment of the present invention.

Referring to FIG. 50, the position sensors 600 are further illustrated in relation to the moving plate 66. In the open valve position, moving plate 66 may contact one of the position sensors 600. At the other extreme position, in the closed position of the valve, moving plate 66 may contact the other position sensor 600. By providing contact between the electrically conductive moving plate 66 and one of the position sensors 600, a closed contact connection may indicate the open or closed position of the moving plate 66. Alternately, it should be appreciated that non-contact sensors 600 may be employed to sense when the moving plate 66 is in either of the open and closed positions. For example, capacitive or laser sensors may be used to sense distance from the sensor 600 to the moving plate 66. Further, one or two position sensors 600 may be employed to sense position of the moving plate 66 at intermediate locations between the open and closed positions. It should be appreciated that one or more position sensors 600 may be employed in a variety of valve configurations to sense the open and closed positions of the valve for regulating fluid to a fluid consuming battery, including the various embodiments of the fluid regulating system disclosed herein.

Figure 51:
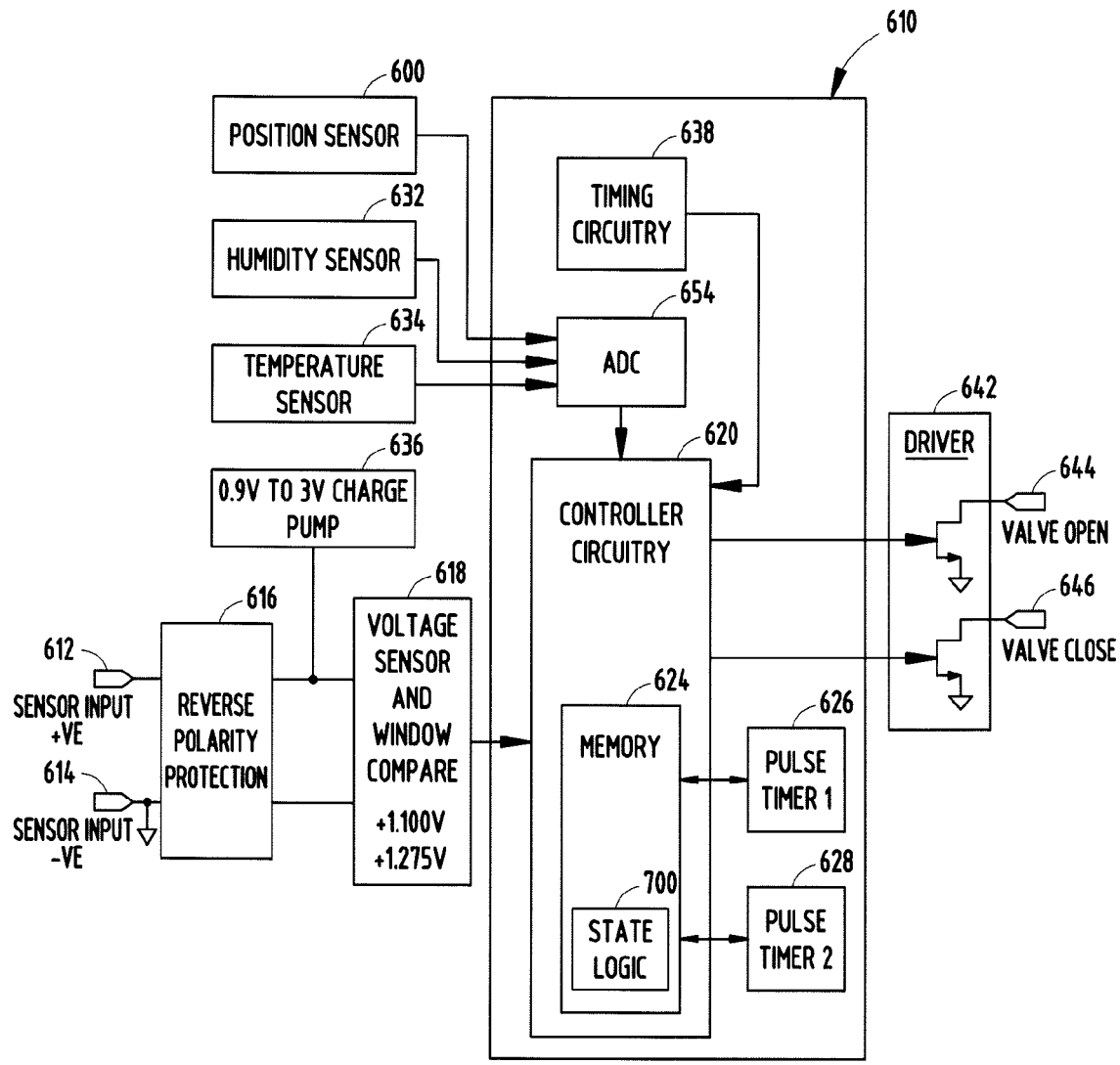
FIG. 51 is a block diagram illustrating control circuitry for controlling the valve of the fluid regulating system according to one embodiment of the present invention.

Referring to FIG. 51, valve control circuitry 610 is illustrated, according to one embodiment. According to this embodiment, the valve control circuitry 610 employs a controller 620. According to one embodiment, the controller 620 may include an Application Specific Integrated Circuit (ASIC) configured with logic, such as software, which executes a state logic routine 700. The ASIC may be configured on a chip such as component 546 shown in FIG. 37. According to another embodiment, the controller 620 may include a microcontroller that has a microprocessor and may include memory such as random access memory (RAM) and read-only memory (ROM). The microcontroller 620 executes the state logic 700 as described herein for processing sensed inputs and providing control output signals to control the valve actuation. The control circuitry 610 may be included with or used in place of component 546 in FIG. 37 or control circuitry 90 shown in FIGS. 4, 6-8 and 11.

The valve control circuitry 610 is also shown including analog-to-digital converter (ADC) circuitry 654 which receives various inputs and converts the analog inputs to digital signals which are input to the controller 620. Timing circuitry 638 provides a timing signal to the controller 620. Additionally, a pulse timer 1 in block 626 and a pulse timer 2 in block 628 are provided to provide inputs to the controller 620 for defining time periods for opening and closing the valve, respectively.

The valve control circuitry 610 receives various inputs including sensed voltages +VE and −VE which are indicative of the sensed battery voltage across the positive and negative terminals of the battery at input terminals 612 and 614. The sensed voltages from inputs 612 and 614 are input to a reverse polarity protection circuit 616 which protects against reverse polarity connection with the battery. The sensed voltages +VE and −VE are also input to a voltage sensor and window compare circuit 618. The voltage sensor and window compare circuit 618 senses the differential voltage and compares the battery voltage to voltage threshold values that define a window of operation. According to one embodiment, a first low voltage of 1.10 volts is used as the low threshold voltage to decide whether to open the valve and supply fluid to the battery when the sensed voltage drops below the first low threshold of 1.10 volts. According to this embodiment, a second high voltage of 1.275 volts is employed as the high threshold voltage to decide whether to close the valve when the sensed voltage exceeds the second high threshold of 1.275 volts. An output of the voltage sensor and window compare circuit 618 is provided as an input to the controller 620. Additionally, a 0.9 volt to 3.0 volt charge pump 636 is provided for providing a stepped up voltage that may be used for operation of the circuitry.

The valve control circuitry 610 also receives various sensor inputs which are converted from analog to digital signals by way of the analog-to-digital converter 654. Included are signal inputs from one or more position sensors 600 for sensing position of the moving plate of the valve. Additionally, a humidity sensor 632 senses humidity of the valve and provides an input to control circuitry 610. Further, a temperature sensor 634 senses temperature of the valve and provides the sensed temperature signal to the control circuitry 610. It should be appreciated that the humidity sensor 632 and the temperature sensor 634 essentially sense an operating condition of the fluid regulating system. By sensing an operating condition of the fluid regulating system, a minimum required time $T_{MIN}$ used for maintaining the valve in the open position may be determined based on the sensed operating condition. The minimum required time $T_{MIN}$ may be dynamically adjusted periodically based on the sensed operating condition by selecting the time $T_{MIN}$ from a lookup table. Further, it should be appreciated that the position sensor may provide a position signal which may be indicative of a wear parameter of the valve such that it also provides a sensed operating condition of the fluid regulating system. As used herein, a wear parameter means a property, such as a physical or electrical property, of a valve component that can change during the useful life of the valve in such a way as to be useful, such as in estimating a point in the valve's expected lifetime or an indication of the valve's impending failure. For example, the time or energy required for a valve to move from one position to another, as indicated by a pair of position sensors, may gradually increase over time and/or become excessive shortly before the valve will no longer operate acceptably. Such changes may be due to factors such as physical wear caused by friction, fatigue due repeated motions, improper operation or failure due to dirt or breaks, and so on.

The valve control circuitry 610 provides output signals to driver circuitry 642. The driver circuitry 642 may include drive transistors, according to one embodiment, that generate drive signals at outputs 644 and 646 to drive the actuators to open and close the valve.

Figure 52:
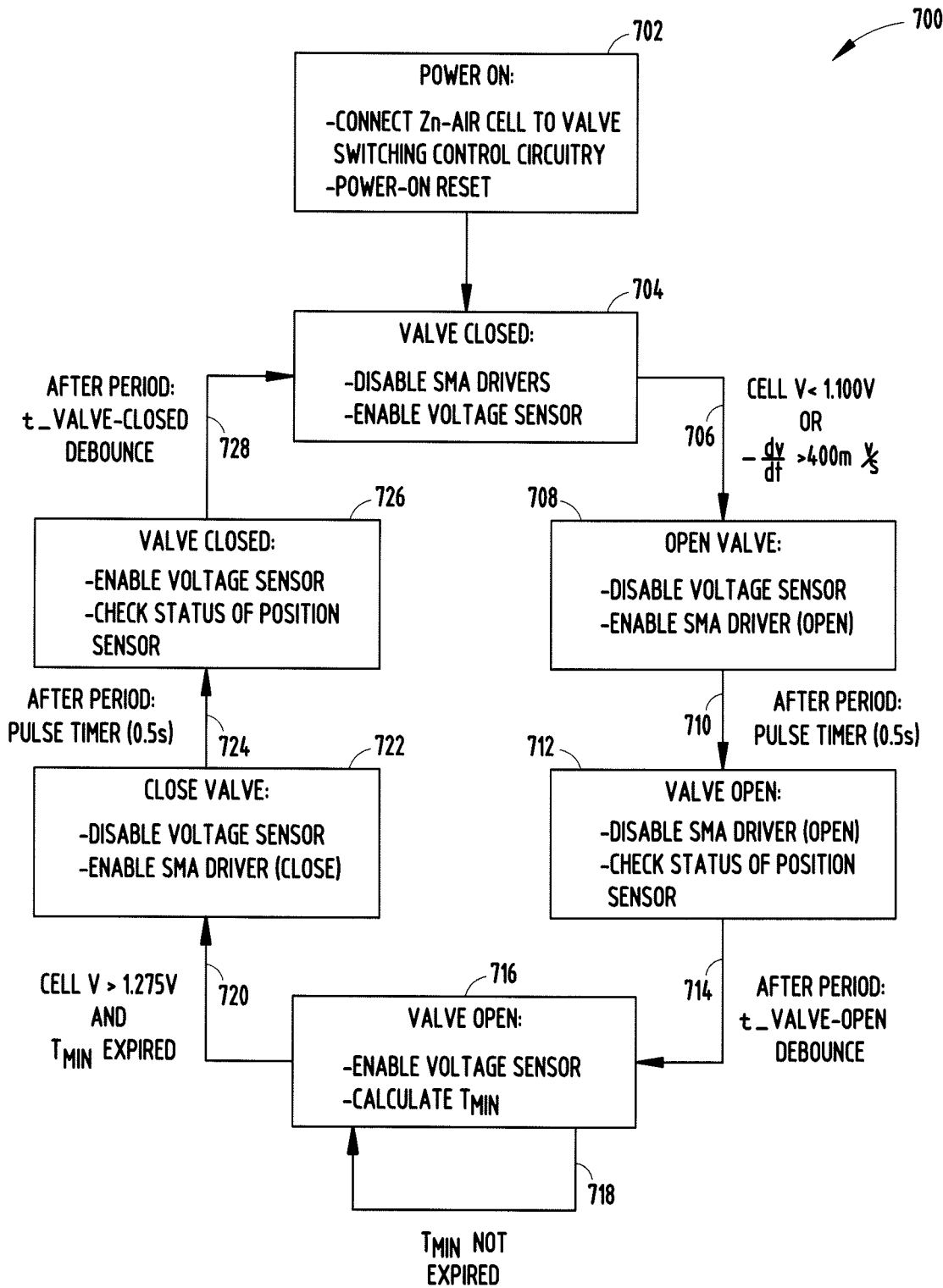
FIG. 52 is a state diagram illustrating the state logic executed by the control circuitry to control the valve, according to one embodiment of the present invention.

Referring to FIG. 52, the state logic routine 700 executed by the controller is illustrated according to one embodiment. The logic routine 700 includes a power on state in block 702 in which a device to be powered is energized. In the power on state 702, a fluid consuming cell, such as a zinc-air cell, is connected to the valve switching control circuitry and a power on reset is activated. Prior to being powered on, the valve is in the valve closed state as shown in block 704. In the valve closed state 704, the SMA drivers are disabled and the voltage sensor is enabled. The valve will remain in the valve closed state 704 until either the battery cell voltage drops below the lower first threshold of 1.10 volts or if the rate of change of battery electrical output, such as rate of change of voltage (dv/dt), exceeds a rate of change threshold, such as 400 millivolts/second as shown by event 706. Upon event 706 occurring, the valve begins to transition to an open valve state during which the valve begins to open by applying power to the appropriate SMA actuator. In the open valve state 708, the voltage sensor is disabled, and the SMA driver for actuating the valve to the open position is enabled to activate the actuator. The valve, once actuated, will then transition to a valve open state 712 following a period of time as determined by pulse timer 1. According to one example, the pulse timer period is about 0.5 seconds. This provides sufficient time for the SMA driver to drive the valve to the full open position. In the valve open state 712, the SMA driver for opening the valve is disabled, and the status of the position sensor(s) is checked. Once in the valve open state 12, routine 700 waits for a time period t_valve-open debounce to prevent the occurrence of false triggering in step 714. Time period t_valve-open debounce may be a predetermined time period, such as 50 ms in one example, sufficient to realize a steady voltage output. Routine 700 then proceeds to valve open state 716. At valve open state 716, the voltage sensor is enabled and the minimum time period $T_{MIN}$ required for keeping the valve open is calculated.

While in the valve open state 716, routine 700 checks in step 718 for whether the minimum required time $T_{MIN}$ has expired and, if not, maintains the valve in the valve open state 716. It should be appreciated that the minimum time period $T_{MIN}$ maintains the valve in the open position, such that the valve is not repeatedly opened and closed. Additionally, the minimum required time $T_{MIN}$ is used to maintain the valve in the open position in a manner that minimizes the use of energy by the valve actuator and a corresponding battery capacity loss to otherwise open the valve earlier by requiring that the valve be maintained in an open position for the minimum time period $T_{MIN}$. The valve is thereby restricted from actuating at a greater frequency so that battery capacity is not wasted. The minimum time period $T_{MIN}$ can be calculated based on the battery capacity required to open and close the valve and the battery capacity lost while the valve is open. The minimum time period $T_{MIN}$ may initially be computed by calculating a first battery capacity loss required to close the valve, calculating a second battery capacity loss required to open the valve, calculating a battery capacity loss rate by leaving the valve in the open position, and calculating the minimum required time based on a comparison of the calculated first and second battery capacity losses and the calculated battery capacity loss rate. Variations in the minimum required time $T_{MIN}$ may then be stored in memory based on one or more operating conditions, such as temperature and used to maintain the valve in the open position upon actuation.

According to one embodiment, the minimum required time period $T_{MIN}$ is determined based on a sensed operating condition. More specifically, the minimum required time period $T_{MIN}$ is dynamically adjusted based on the sensed operating condition. The sensed operating condition may include sensed temperature, according to one embodiment. According to another embodiment, the sensed operating condition may comprise humidity sensed with a humidity sensor. According to a further embodiment, the sensed operating condition may comprise a wear parameter. The sensed wear parameter may be determined based on a known state of the valve and the position sensor sensing the valve in open and closed positions.

The valve remains in the valve open state 716 until both events in step 720 of the cell voltage exceeding the upper second voltage limit of 1.275 volts and the minimum time period $T_{MIN}$ has expired. If the cell voltage exceeds the upper second voltage threshold of 1.275 volts and the minimum time period $T_{MIN}$ has expired, the valve transitions to the close valve state 722 during which the valve is actuated towards the closed position. In the close valve state 722, the voltage sensor is disabled and the SMA driver for closing the valve is enabled. The valve then transitions to the valve closed state 726 after waiting for a period of time set by pulsed timer 2, such as 0.5 seconds in one example, in step 724. In the valve closed state 726, the voltage sensor is enabled and the status of the position sensor is checked. The routine 700 then proceeds to further transition to the valve closed state 704 after a time period t_valve-closed debounce in step 728 to prevent the occurrence of false triggering. The time period t_valve-closed may be a predetermined time, such as 50 ms, sufficient to realize a steady state output voltage. In the valve closed state 704, the SMA drivers are disabled and the voltage sensor is enabled. It should be appreciated that the routine 700 may then be repeated amongst the various states.

The fluid regulating system advantageously controls the fluid supplied to the fluid consuming battery by monitoring the voltage of the battery and controlling the supply of fluid to the fluid consuming battery by opening the valve when the monitored voltage drops below a first lower threshold voltage of 1.0 volts per cell and by closing the valve when the voltage rises above a second upper voltage of 1.275 volts per cell. Additionally, the fluid regulating system and method of the present invention further monitor a rate of change in battery voltage with respect to time. Specifically, the rate of change of voltage dv/dt of the battery is monitored and compared to a voltage rate of change threshold, such as 400 millivolts/second/cell, and the valve is opened when the monitored rate of change in voltage exceeds the rate of change threshold. It should be appreciated that while the rate of change of battery electrical output is shown and described herein as a rate of change of voltage, it should be appreciated that a variety of energy measurements can be used, such as open circuit voltage, closed circuit voltage, current, power and combinations thereof, according to other embodiments. According to another embodiment, the battery electrical output monitored may include battery current detected by a current detector, and the rate of change in battery current is compared to a current rate of change threshold. According to one embodiment, the rate of change in voltage is monitored when the valve is in the closed position, and the rate of change in voltage is the rate of decrease in voltage. It should be appreciated that by opening the valve when the monitored rate of change of voltage exceeds the voltage rate of change threshold, the fluid regulating system and method of the present invention advantageously opens the valve more quickly so as to prevent disruption in service of the device being powered by the battery. Further, the rate of change threshold may be adjusted based on a sensed operating condition. According to one embodiment, the sensed operating condition for adjusting the rate of change threshold is at least one member of the group consisting of a temperature, humidity and a wear parameter. According to another embodiment, the sensed operating condition may include any one or any combination of temperature, humidity and wear parameters.

The minimum required time period $T_{MIN}$ for maintaining the valve in the open position is dynamically adjusted based on a sensed operating condition. According to one embodiment, the sensed operating condition is sensed temperature sensed by the temperature sensor. Referring to FIG. 23, a lookup table provides a plurality of temperatures and corresponding minimum time periods $T_{MIN}$ that may be selected from to adjust the minimum required time, according to one example. As the sensed temperature varies, the minimum required time $T_{MIN}$ is dynamically adjusted as a function of the sensed temperature. The minimum required time $T_{MIN}$ may be determined by interpolation or extrapolation of the temperature data and may be determined based on an equation. It should be appreciated that a similar lookup table may be employed based on other sensed operating conditions, such as humidity and wear parameters, and that a combination of multiple sensed operating conditions may be employed to adjust the minimum required time $T_{MIN}$.

Although the present invention has been described above with respect to a fluid regulating system supplying fluid to single batteries having a single cell, aspects of the present invention may apply to batteries having multiple cells, and battery packs having multiple batteries. For example, the fluid regulating system may be completely or partially disposed in a housing of a battery pack so as to selectively open and close a valve that allows air or another fluid to pass into the battery pack housing. In this case, separate fluid regulating systems would not be needed for each battery. Further, the fluid regulating system could be powered from any one or group of the batteries or all of the batteries within the battery pack or from another battery outside the battery pack.

The fluid regulating system may also be disposed completely or partially within a device that is powered by the battery, batteries, or battery pack or otherwise provided separate from the battery, batteries, or battery pack. For example, the valve could be a pre-packaged module that serves a variety of multi-cell pack sizes. So there may be advantages to packaging the valve, valve power supply and controls separately from the fluid consuming cells.

The combination of a fluid consuming battery and a fluid regulating system can include a module containing all or a portion of the fluid regulating system into which one or more replaceable fluid consuming batteries are inserted. This allows reuse of at least part of the fluid regulating system, thereby reducing the cost per battery to the user. The module can include one or more fluid inlets and can also include internal channels, plenums or other internal spaces that provide a passageway for fluid to reach the battery. The module and battery can be held together in any suitable manner, including the use of electrical contacts that are part of the module that cooperate with the corresponding electrical contacts that are part of the battery to prevent inadvertent separation of the module and battery. For example, the electrical contacts on the module can be in the form of projecting blades that snap into slots in the battery case that contain the battery electrical contacts. The blades can be held in the slots by any suitable means, such as by interference fit, one or more springs, a mechanical locking mechanism and various combinations thereof. The module and battery dimensions, shapes and electrical contacts can be configured to allow mating of the module and battery in only the proper orientations in order to assure proper electrical contact and prevent battery reversal. The module, the battery or both can have external contact terminals for making proper electrical contact with a device in which the combined battery and module are installed. In some embodiments the battery can be replaced without removing the module from the device.

While the invention has been described in detail herein in accordance with certain preferred embodiments thereof, many modifications and changes therein may be affected by those skilled in the art without departing from the spirit of the invention. Accordingly, it is our intent to be limited only by the scope of the appending claims and not by way of the details and instrumentalities describing the embodiments shown herein.

What is claimed is:

1. A method of controlling fluid supplied to a fluid consuming battery, said method comprising the steps of:
   providing a fluid regulating system that comprises a valve for adjusting rate of passage of fluid into a fluid consuming electrode of a battery and an actuator for operating the valve;
   monitoring a rate of change in battery electrical output with respect to time;
   comparing the monitored rate of change in battery electrical output to a rate of change threshold; and
   opening the valve for at least a minimum time period when the monitored rate of change in battery electrical output exceeds the rate of change threshold.

2. The method as defined in claim 1, wherein the step of monitoring a rate of change in battery electrical output with respect to time comprises monitoring a rate of change in battery voltage with respect to time, and the step of comparing the monitored rate of change in battery electrical output to a rate of change threshold comprises comparing the monitored rate of change in battery voltage to a voltage rate of change threshold, and wherein the valve is opened when the monitored rate of change battery voltage exceeds the voltage rate of change threshold.

3. The method as defined in claim 1, wherein the step of monitoring the rate of change in battery electrical output is performed when the valve is in the closed position.

4. The method as defined in claim 1, wherein the rate of change in battery electrical output is a rate of decrease in battery electrical output.

5. The method as defined in claim 1 further comprising the step of closing the valve when a monitored battery voltage reaches a voltage threshold.

6. The method as defined in claim 1, wherein the fluid consuming electrode comprises an air electrode.

7. The method as defined in claim 1 further comprising the steps of providing a position sensor and sensing a valve position.

8. The method as defined in claim 1, wherein the battery electrical output monitored comprises a battery current.

9. A method of controlling fluid supplied to a fluid consuming battery, said method comprising the steps of:
   providing a fluid regulating system that comprises a valve for adjusting rate of passage of fluid into a fluid consuming electrode of a battery and an actuator for operating the valve;
   monitoring a rate of change in battery electrical output with respect to time;
   comparing the monitored rate of change in battery electrical output to a rate of change threshold;
   sensing and operating condition of the fuel regulating system;
   adjusting the rate of change threshold based on the sensed operating condition; and
   opening the valve when the monitored rate of change in battery electrical output exceeds the rate of change threshold.

10. The method as defined in claim 9, wherein the operating condition is at least one member of the group consisting of a temperature, humidity and a wear parameter.

* * * * *